(12) United States Patent
Sun et al.

(10) Patent No.: US 12,330,872 B2
(45) Date of Patent: *Jun. 17, 2025

(54) ROBOTIC SYSTEM FOR IDENTIFYING ITEMS

(71) Applicant: Dexterity, Inc., Redwood City, CA (US)

(72) Inventors: Zhouwen Sun, San Mateo, CA (US); Robert Holmberg, Mountain View, CA (US); Shitij Kumar, Santa Clara, CA (US); Jeesu Baek, San Mateo, CA (US); Joseph Li, San Jose, CA (US); Kishore Ranganath Ramakrishnan, Raleigh, NC (US); Andrew Lovett, San Mateo, CA (US); Cyril Nader, Palo Alto, CA (US); Farshid Farhat, Santa Clara, CA (US); David Leo Tondreau, III, San Francisco, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,983

(22) Filed: Jan. 8, 2024

(65) Prior Publication Data

US 2024/0140712 A1 May 2, 2024

Related U.S. Application Data

(63) Continuation of application No. 17/246,356, filed on Apr. 30, 2021, now Pat. No. 11,905,115.

(51) Int. Cl.
*B07C 5/36* (2006.01)
*B07C 5/34* (2006.01)
(Continued)

(52) U.S. Cl.
CPC .......... *B65G 1/1371* (2013.01); *B07C 5/3412* (2013.01); *B07C 5/362* (2013.01);
(Continued)

(58) Field of Classification Search
CPC .. B65G 1/1371; B65G 1/1378; B07C 5/3412; B07C 5/362; B07C 2501/0063; B07C 5/36; B25J 9/0093; B25J 9/1664; G06K 7/1413
See application file for complete search history.

(56) References Cited

U.S. PATENT DOCUMENTS 9,227,323 B1  1/2016 Konolige
9,878,349 B2  1/2018 Crest
(Continued)

FOREIGN PATENT DOCUMENTS

CN  207929579  10/2018
CN  108351637  8/2021
(Continued)

*Primary Examiner* — Patrick H Mackey
(74) *Attorney, Agent, or Firm* — Van Pelt, Yi & James LLP

(57) ABSTRACT

A method and system for obtaining an identifier from an item is disclosed. The method includes autonomously operating a robotic structure having a robotic arm to pick an item using an end effector of the robotic arm along a predetermined path from a source location to a destination location according to a plan. The picked item is moved according to the plan. An active measure is determined to be performed at least in part to obtain an identifier determined to be missing based on information received via the communication interface from one or more sensors. The robotic structure is autonomously operated to place the item at the destination location based at least in part on the plan.

18 Claims, 11 Drawing Sheets

(51) Int. Cl.
*B25J 9/00* (2006.01)
*B25J 9/16* (2006.01)
*B65G 1/137* (2006.01)
*G06K 7/10* (2006.01)
*G06K 7/14* (2006.01)

(52) U.S. Cl.
CPC ........... *B25J 9/0093* (2013.01); *B25J 9/1664* (2013.01); *G06K 7/10366* (2013.01); *G06K 7/1413* (2013.01); *B07C 2501/0063* (2013.01); *B25J 9/1689* (2013.01)

(56) References Cited

U.S. PATENT DOCUMENTS

| | | | |
|---|---|---|---|
| 10,007,827 B2 * | 6/2018 | Wagner | G06K 7/10693 |
| 10,058,896 B2 | 8/2018 | Hicham | |
| 10,246,258 B2 | 4/2019 | Lisso | |
| 10,679,379 B1 | 6/2020 | Diankov | |
| 10,696,493 B1 | 6/2020 | Diankov | |
| 11,020,854 B2 | 6/2021 | Kanunikov | |
| 11,407,107 B2 | 8/2022 | Neville | |
| 11,905,115 B2 * | 2/2024 | Sun | B65G 1/1376 |
| 2013/0110280 A1 | 5/2013 | Folk | |
| 2017/0121113 A1 | 5/2017 | Wagner | |
| 2017/0286773 A1 | 10/2017 | Skaff | |
| 2020/0016746 A1 | 1/2020 | Yap | |
| 2020/0095001 A1 * | 3/2020 | Menon | B25J 9/0093 |
| 2020/0238517 A1 | 7/2020 | Diankov | |
| 2020/0238519 A1 | 7/2020 | Diankov | |
| 2020/0270069 A1 | 8/2020 | Bellar | |
| 2020/0346351 A1 | 11/2020 | Edwards | |
| 2020/0346792 A1 | 11/2020 | Curhan | |
| 2021/0009351 A1 | 1/2021 | Beinhofer | |
| 2021/0056505 A1 | 2/2021 | Tiwari | |
| 2022/0111420 A1 * | 4/2022 | Breysse | B25J 9/1697 |
| 2023/0271791 A1 | 8/2023 | Graston | |
| 2023/0303342 A1 | 9/2023 | Kulkarni | |

FOREIGN PATENT DOCUMENTS

| | | |
|---|---|---|
| JP | H05217014 | 8/1993 |
| JP | H05303660 | 11/1993 |
| JP | 2019185561 | 10/2019 |
| JP | 2020189721 | 11/2020 |
| WO | 2020092447 | 5/2020 |

* cited by examiner

ROBOTIC SYSTEM FOR IDENTIFYING ITEMS

CROSS REFERENCE TO OTHER APPLICATIONS

This application is a continuation of U.S. patent application Ser. No. 17/246,356 entitled ROBOTIC SYSTEM FOR IDENTIFYING ITEMS filed Apr. 30, 2021 which is incorporated herein by reference for all purposes.

BACKGROUND OF THE INVENTION

Robots have been used to perform tasks in manufacturing and other fields. For example, robots have been used to perform tasks in environments that may be unhealthy or otherwise dangerous to humans, tasks that require the application of force greater than a human may be able to apply, and tasks that require a high degree of precision and consistency over time.

Autonomous robots perform at least some tasks in an automated manner, without requiring human control or direction. For example, automated robots have been used to perform repetitive and/or otherwise predetermined tasks and sequences of tasks, typically in a controlled environment, such as a factory. More recently, self-driving cars, delivery drones, and other autonomous vehicles have been under development.

Teleoperation in the field of robotics refers to remote operation of a robot by an operator. For example, robots have been used to perform surgery, defuse bombs, and perform other tasks under the control of a skilled human operator.

Kitting and singulation related process are traditionally very labor intensive processes for which the adoption of robotics is challenging because of the mobility restrictions and the difficulty of providing and programming a robot to perform tasks such as reaching into a bin or shelf, picking up items of arbitrary size, fragility, consistency, etc., or to perform such tasks as sorting an arbitrary mix of items. As a result, large scale kitting and/or singulation operations have continued to be human labor intensive.

Another challenge with the use of robotics in connection with kitting and singulation related process is the design and selection of end effectors. The end effector of a robotic arm is the module with which the robotic arm may engage with an item in a source pile/flow. Different types of end effectors may are better optimized for certain sizes, packaging types, weights, shapes, etc. Further, the size of the end effector or robotic arm (e.g., the wrist) to which the end effector is connected impedes the ability of the robotic arm to each into a bin/shelf, source pile/flow, etc.

BRIEF DESCRIPTION OF THE DRAWINGS

Various embodiments of the invention are disclosed in the following detailed description and the accompanying drawings.

DETAILED DESCRIPTION

Figure 1:
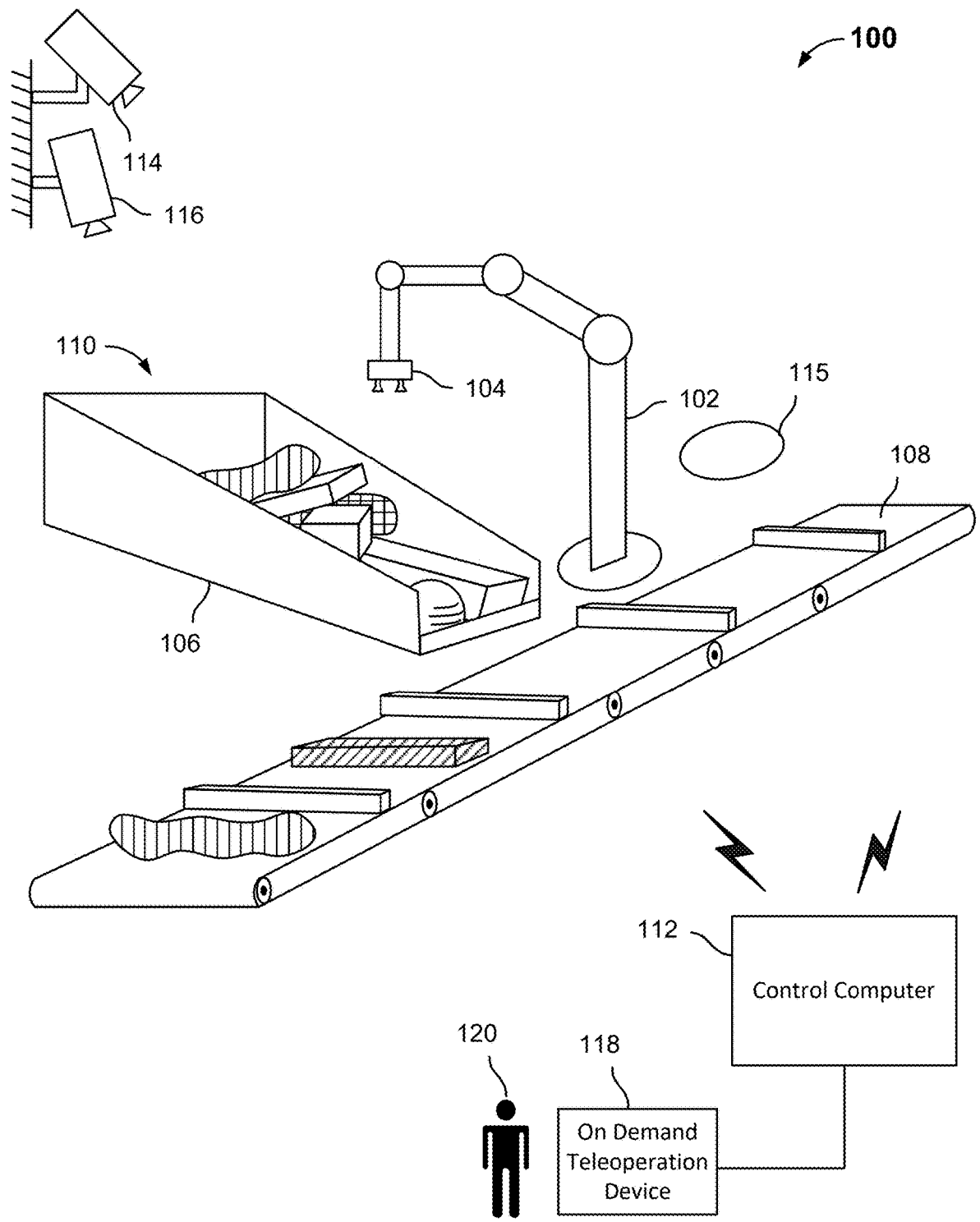
FIG. 1 is a diagram illustrating a singulation system according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, kitting includes the picking of one or more items/objects from corresponding locations and placing the one or more items in a predetermined location in a manner that a set of the one or more items correspond to a kit.

As used herein, singulation includes the picking of one or more items/objects from a source pile or flow, and singly placing the one or more items in corresponding predetermined locations such as locations on a segmented conveyor (e.g., within trays on a conveyor) or similar conveyance to be sorted and routed for transport to a downstream (e.g., ultimate addressed/physical) destination.

As used herein, an identifier includes a label, a bar code, a symbol, an image, an alphanumeric string, a code, or the like. The identifier may be printed on a label affixed to an item, included on a side of an item, embedded on a Radio-frequency identification (RFID) tag attached to an item, etc. In some embodiments, the identifier comprises machine readable information, such as text and/or optically or otherwise encoded information, which can be machine read and used in connection with kitting or singulating the object and/or item, e.g., via an automated kitting system and/or processing, and/or an automated singulation system and/or processing.

As used herein, a sensor includes a machine reader such as radio-frequency (RF) tag readers, optical code readers, etc. The machine reader may obtain (e.g., read) machine readable information corresponding to an item (e.g., an identifier on or otherwise embedded in an item, etc.)

"Kitting machines" or "kitting systems" and their integration into highly automated kitting operations are disclosed. In various embodiments, a kitting machine as disclosed herein comprises an at least partly robotically controlled unit that supplies and positions an item to facilitate the item being located, picked up, and/or positioned in and/or for packaging and/or shipment as part of a kitting operation. In various embodiments, a kitting machine as disclosed herein may comprise one or more kitting system modules, each comprising a modular component. A kitting system module as disclosed herein may comprise one or more shelves, bins, or other receptacles. In some embodiments, the shelves, bins, or other receptacles may be positioned via robotic control to position an item of pick up. A kitting system module as disclosed herein may be integrated with one or more other kitting system modules, one or more robotic arms, and/or other components to comprise an at least partly automated kitting system, capable of locating, selecting, and packing prescribed quantities of each of one or more arbitrary individual items, such as items included in an order, invoice, or similar data.

A kitting system configured to perform kitting is disclosed. In some embodiments, the kitting system includes a kitting shelf system that is used in connection with kitting. The kitting shelf system may include one or more shelves on which one or more items are stored for use in a kitting process for assembling one or more kits. The kits may be assembled based at least in part on a corresponding order (e.g., based on a packing slip associated with the order). Various embodiments include one or more robotic systems. A robotic system may include one or more robotic arms that are respectively configured to autonomously operate to pick an item/object from a first location (e.g., a source location) and place the item/object in a second location (e.g., a destination location). A robotic arm included in a kitting system may be controlled to operate (e.g., autonomously) pick and place the item/object according to a plan to assemble a kit.

Each item or object on the kitting shelf (e.g., within a receptacle on the kitting shelf) may have machine readable information, such as text and/or optically or otherwise encoded information, which can be machine read and used in connection with kitting the object and/or item, e.g., via an automated kitting system and/or processing. As an example, to read the information for a given item (or object within the item), one or more sensors may obtain information pertaining to the item while the item is within the kitting shelf system (e.g., on a shelf of the kitting shelf system such as on a presentation face of the shelf, etc.). As another example, to read the information for a given item (or object within the item), one or more sensors may obtain information pertaining to the item while the item is being moved (by the robotic arm) from the kitting shelf system to the corresponding receptacle (e.g., the information pertaining to the item is scanned during a path/trajectory of the item from the kitting shelf system to the receptacle). The item or object on the kitting shelf may be disposed in a receptacle on the kitting shelf, and the receptacle may be a tray, a box (e.g., a cardboard box), a tote, etc. In some examples, the receptacle is placed within a large receptacle that is placed on the kitting shelf. In some embodiments, the workspace corresponding to the kitting shelf includes one or more sensors, and the one or more sensors may obtain information associated with items/objects within the workspace. For example, information associated with items/objects may be obtained while the robotic arm approaches the item/object to pick up the item/object. As an example, sensor (e.g., a camera) disposed above the chute may capture the information associated with items/objects (e.g., a barcode or other identifier) so that the system has the information before the robotic arm grabs the item/object. As another example, a camera mounted to the robotic arm may capture the information associated with items/objects (e.g., a barcode or other identifier) as the robotic arm moves to grab/pick up the item/object. As another example, a sensor mounted to the robotic arm may capture the information associated with items/objects (e.g., information from an RFID tag on the item) as the robotic arm moves to grab/pick up the item/object.

A robotic system to perform singulation is disclosed. In various embodiments, singulation is performed based on data associated with a workspace or an item within the workspace. A plan (e.g., to singulate an item) is determined based at least in part on an attribute of an item in the workspace. The attribute of the item may be determined based at least in part on the sensor data obtained with respect to the workspace. As used herein, a workspace (e.g., at least with respect to a singulation system and/or singulation process) may include a chute or other conveyance structure and/or receptacle on which a source pile/flow of items is disposed, a destination conveyance structure on which an item from the chute is to be singly placed, and a robotic structure that includes a robotic arm that picks one or more items from the chute (or other source) and places the one or more items singly, each in a corresponding location on the destination conveyance structure. The workspace can further include a control computer that obtains sensor data associated with the workspace, and/or an on-demand teleoperation device that a human operator can use to control an element within the workspace such as the robotic arm and/or the conveyance structure. As used herein, the term slot or tray may be used interchangeably in connection with describing a particular location on the conveyor.

A robotic system includes a robotic arm and end effector used to pick items from a source pile/flow (e.g., a source location) and place them on a segmented conveyor or similar conveyance to be sorted and routed for transport to a downstream (e.g., ultimate addressed/physical) destination (e.g., a destination location). As used herein, singulating an item includes picking an item from a source pile/flow and placing the item singly on or in a destination, such as a location on a destination conveyance structure (e.g., a segmented conveyor or similar conveyance). In some embodiments, multiple robots are coordinated to implement a desired collective throughput. In various embodiments, one or more robots may be employed at a singulation station. A robotic system may include multiple stations. As an example, each station can correspond to a distinct workspace (e.g., a distinct chute comprising the source pile/flow).

Human workers may be employed at one or more stations. The robotic system in various embodiments may be configured to invoke (request) the assistance of a human worker, e.g., by teleoperation of a robotic arm, manual task completion, etc., for example to handle an item the robot cannot handle by fully automated processing and/or an item the robot has dropped, etc. In some embodiments, a plurality of robotic arms operating at the same workspace work independently to singulate the plurality of items. In connection with the singulation of an item, a plan or strategy can be determined for singulating the item from the source pile/flow at which the item is located to a corresponding location on the conveyor. The corresponding location on the conveyor can be a particular slot or tray on the conveyor. In some embodiments, a slot or tray on the conveyor is associated with an identifier (e.g., a unique identifier with respect to the conveyor within the robotic system).

In some embodiments, a plurality of robots (e.g., robotic arms) may operate to singulate items within a particular chute. In the case of an item that is a square or rectangular shape, an identifier may be located on any one or more of the six sides of the item. The plurality of robotics may coordinate their respective positions and movements to ensure that a robotic arm that is not grasping the particular item is not between the item and at least one of the one or more scanners, or otherwise ensure that the robotic arm is not blocking/obstructing the visibility or ability of the at least one sensor to obtain information pertaining to the item. In some embodiments, a plurality of robotics coordinate to both grasp an item and move the item to the conveyor, and to move the item within range of a sensor (e.g., a predefined range of the sensor). For example, the plurality of robots may be controlled to pick up an item that is relatively flat or that is relatively large (e.g., sufficiently large that moving the item via a single robot may not satisfy a stability threshold for a grasp of the item).

In some embodiments, a plan/strategy in connection with singulating an item may include presenting one or more sides of an item to one or more scanners. For example, the robotic arm may be controlled to move the item in a manner that a plurality of sides of the item are presented to a scanner. Presenting a plurality of sides of the item to a scanner may include rotating the item, or changing an orientation of the item, as the item is moved (e.g., from the chute to the conveyor on which the item is singulated).

According to various embodiments, the plan or strategy includes an indication of an item (e.g., from the source pile/flow) to be singulated, a location on the conveyor at which the item is to be singly placed, and a path or trajectory along which the item is to be moved from the source pile/flow to the location on the conveyor. The plan or strategy includes information pertaining to the location on the conveyor at which the item is to be singly placed, such as an identifier of a slot or tray on the conveyor in which the item is to be placed. In some embodiments the plan or strategy includes instructions that the robotic structure that is to singulate the item uses in order to singulate the item. As an example, the instructions provide an indication of the manner according to which the robotic structure is to control the corresponding robotic arm to pick the item from the chute, to move the item along the path or trajectory, and to place the item at the determined location on the conveyor.

The path or trajectory along which an item is to be singulated is determined according to various embodiments based at least in part on sensor data. The robotic system may obtain a plurality of sensors that output information pertaining to the workspace, including the items or objects within the workspace. The sensor data is obtained based on the information output from one or more sensors and used in connection with determining the path or trajectory. In some embodiments, the path or trajectory is determined based at least in part on one or more attributes of the item to be singulated. Examples of attributes of the item include a weight, a size (e.g., one or more dimensions), a type of packaging, an identifier on the item, a location of an identifier or label on the item, a location of the item relative to the chute and/or conveyor, information obtained from the identifier or label on the item, etc. Various other attributes can be used in connection with determining the path or trajectory. Determination of the path or trajectory of the item may be further based at least in part on a location on the conveyor at which the item is to be placed, an attribute of an item(s) already on the conveyor, an attribute of an item within the workspace (e.g., an item within the source pile/flow), a grip strength with which the robotic arm has grasped the item, a speed with which the robotic arm is to move the item, etc. In some embodiments, the path or trajectory of the item is based at least in part on a location of one or more sensors within the workspace. In some embodiments, the path or trajectory is determined based at least in part on a likelihood one or more sensors may obtain information associated with the item (e.g., an identifier on the item, etc.). For example, historical information may be used to determine one or more locations or ranges at which a sensor in the workspace has successfully obtained information from an item. The robotic system may use the historical information in connection with modelling a workspace and determining locations or ranges associated with a relatively high degree of success with respect to a sensor obtaining information pertaining to the sensor. For example, the historical information may indicate that a location having coordinates $x1$, $y1$, $z1$ is associated with a 99% success rate of valid scans (e.g., obtaining information from an item at such location), and a location having coordinates $x2$, $y2$, $z2$ is associated with a 98% success rate of valid scans. In some embodiments, the system may use the historical information to determine the path or trajectory in a manner that optimize a likelihood of obtaining information from the item. In some embodiments, the system determines the path or trajectory based at least in part on a threshold pertaining to a likelihood of obtaining information from the item (e.g., in a manner that the selected path or trajectory satisfies a preset minimum likelihood of obtaining information from the item). A value pertaining to the likelihood of obtaining information from the item may be included in the cost function associated with determining the plan to move the item (e.g., determining a source location, a destination location, a path or trajectory, etc.). The system may store a mapping of areas/locations of a workspace to values pertaining to a likelihood of obtaining information associated with the item at that area/location. For example, the mapping include a mapping of coordinates to probabilities of a successful scan. The mapping may store information on a sensor-by-sensor basis in manner that probabilities of obtaining the information from an item is determined for one or more particular sensors, and/or the mapping may store information on a workspace basis such that probabilities of obtaining information from item for a set of sensors is aggregated or computed as a collective value. The mapping or modelling of the likelihoods of obtaining information associated with an item may be updated over time (e.g., at predetermined intervals or in response to a request for an update, or on a continuous basis such as in response to each moving of an item).

Various embodiments include a robotic system including a robotic arm that is configured to move an item along a predetermined path from a source location to a destination location. The predetermined path may be determined based on sensor data from one or more sensors within a workspace (e.g., sensor data pertaining to items on a shelf system of a kitting system, sensor data pertaining to a source pile/flow and/or conveyor of a singulation system, etc.). The predetermined path may be configured (e.g., determined) so that as the item is moved along the path the item is within a threshold range of one or more sensors while the item is moved along the predetermined path. The threshold range of the one or more sensors may comprise a line of sight or area within which the one or more sensors may obtain information such as information comprised on, or otherwise associated with, the item (e.g., in the case of a Radio-frequency identification (RFID) sensor, a range or proximity within which the RFID sensor may obtain information from an RFID tag, etc.). As the item is moved through the threshold range, the one or more sensors may obtain formation associated with the item. For example, the one or more sensors may obtain (e.g., capture an image of) one or more identifiers on the item.

According to various embodiments, the robotic system determines whether the one or more sensors obtained sufficient information from the one or more identifiers as the item is moved along the predetermined path. For example, in response to the item being moved through the threshold range of the one or more sensors, the robotic system determines whether the one or more sensors obtained the information corresponding to the one or more identifiers. The robotic system may determine whether information pertaining to at least one of the one or more identifiers was not captured (e.g., determine the one or more sensors failed to obtain information from the at least one identifier). In some embodiments, information indicating a number of identifiers on an item is stored in advance (e.g., before the item is kitted or singulated). For example, the system may store a mapping of items or types of items to a number of identifiers. The number of identifiers mapped to an item or type of item may correspond to an expected number of identifiers. If the robotic system determines that a number of identifiers obtained (or for which information was obtained) by the one or more sensors is less than the expected number of identifiers for the item, then the robotic system may determine that the information obtained by the one or more sensors is insufficient (e.g., that information pertaining to at least one of the one or more identifiers was not captured). In some embodiments, the system determines that more than sufficient information is obtained by the one or more sensors. For example, the one or more sensors may obtain information from a plurality of items (e.g., while intending to obtain information for only a subset of the plurality of items). Examples of instances when more than sufficient information may be captured include when the robotic system is moving an item within range of a sensor and another item is knocked into a frame, or otherwise occupies part of a frame, captured by the one or more sensors. An item may be knocked into the frame of a sensor based on a flow or instability of items in the workspace, or by a robotic arm as it grabs an item, etc. In some embodiments, in response to determining that additional information (e.g., information in excess of the expected information for the item, such as information pertaining to another item in the frame) is obtained, the robotic system may determine a subset of the information that is captured as corresponding to the item being moved (e.g., the information that was intended to be obtained). In some embodiments, in response to determining additional information is obtained, the robotic system controls the robotic arm or another element in the workspace (e.g., a different robotic arm, a compressed air blower, an air knife, etc.) to remove the other item from the frame or line of sight of the sensor.

According to various embodiments, the robotic system associates location coordinates with information on an item (e.g., a label such as a barcode on the item) or location coordinates of the item based on a detection of the information or item by a sensor. For example, the robotic arm (or robotic system) may be calibrated with respect to one or more sensors in the workspace. A mapping of sensors to the workspace (e.g., a mapping of locations of various sensors to the workspace) may be used to determine a plan for moving the item, such as determining a path or trajectory along which the item is to be moved. The mapping of sensors to the workspace may also be used to determine a subset of information obtained by the sensors in the workspace that correspond to a particular item. For example, if sensors in the workspace capture information pertaining to more than one item, then the robotic system may use a time at which the information is captured, a location of the item when the information was captured, and a path or trajectory along which the item was moved to determine the subset of information captured that is associated with the item. If two or more objects are within a sensor frame and information for the two items is obtained, the robotic system may determine a subset of such information that corresponds to a particular item based on when the information was captured and where the item was at the time the information was captured (e.g., based on a path or trajectory along which the item was moved).

According to various embodiments, the mapping of sensors to the workspace may be predefined. For example, the robotic system may be calibrated to determine various predefined ranges or frames of one or more sensors (e.g., sensors in the workspace). Calibration of the robotic system may include moving the robotic arm through a series of static points while grasping a predefined item. The robotic system may analyzed the information that was obtained by the one or more sensors while the robotic arm moved through the series of static points. The analysis of the information that was obtained by the one or more sensors may be used to determine the ranges (e.g., 3D areas) in which the one or more scanners obtain information pertaining to the item (e.g., to calibrate the locations at which the sensors are able to obtain/scan information from the item, and/or the orientation of an item according to which the sensor may scan/obtain information from the item at a particular location). Calibration of the robotic system may further include simulating the movement of one or more items through the workspace and determining expected information that is obtained on the item during the simulation, and then implementing movement of the one or more items to confirm that the expected information is obtained by one more sensors in the workspace.

According to various embodiments, one or more sensors are dynamically controlled to obtain information based at least in part on a location of an item (or expected location of an item). The robotic system may determine a size of an item and a plan or trajectory along which the item is moved, and use the size of the item and the plan or trajectory in connection with determining when to activate a sensor to obtain information. For example, the robotic system may determine when an item is expected to be within a predefined range of the sensor (or within a frame of the sensor).

When the item is within the predefined range of the sensor (or is expected to be within the predefined range), the robotic system may activate the sensor to obtain information pertaining to the item (e.g., scan a barcode on the item). The robotic system may deactivate the sensor or otherwise stop capturing information after the item is determined to be outside the predefined range (or when the item is excepted to be outside the defined range) of the sensor. Dynamic controlling to the sensors based on a location of the item (or expected location of the item) may reduce an amount of images or information captured by the sensors, thereby reducing memory and computation load requirements.

Various embodiments include performing an active measure in response to a determination that the one or more sensors did not obtain information for at least one identifier. For example, in response to the robotic system determining that a number of identifiers obtained (or for which information was obtained) by the one or more sensors is less than the expected number of identifiers for the item, the robotic system may perform the active measure. The active measure may comprise performing one or more further attempts to scan the at least one identifier. For example, the active measure may include moving the item through the threshold range (e.g., within the line of sight of at least one sensor). The active measure may include changing an orientation of the item (e.g., an orientation of one or more sides relative to one or more sensors). The robotic system may change the orientation before performing one or more further attempts to have the information corresponding to the at least one identifier obtained by the one or more sensors. The orientation of the item may be changed while the robotic arm is moving. For example, the robotic arm may be controlled to rotate a wrist of the robotic arm. In some embodiments, the orientation of the item is changed while the robotic arm is moving through at least part of the threshold range of the one or more sensors (e.g., while the item is within a line of sight of at least one sensor). The active measure may include iteratively attempting to obtain the at least one identifier (e.g., the identifier(s) that were not obtained) until (i) all of the identifiers for the item are obtained (or a threshold number of identifiers are obtained), and/or (ii) a threshold number of re-attempts to obtain the at least one identifier have been performed. As an example, the re-attempts to obtain the at least one identifier may be iteratively performed until the earlier of (i) and (ii).

In various embodiments, an integrated kitting system and/or a singulation system as disclosed herein operates in an automated manner unless/until the system gets stuck and has no strategy available to continue automated operation. In some embodiments, in response to entering such a state the system requests human intervention, e.g., by manual assistance, teleoperation, etc.

FIG. 1 is a diagram illustrating a singulation system according to various embodiments.

In the example shown, system 100 includes a robotic arm 102 equipped with a suction-based end effector 104. While in the example shown the end effector 104 is a suction-based end effector, in various embodiments one or more other types of end effector may be used in a singulation system as disclosed herein, including without limitation a pinch-based end effector or other types of actuated grippers. In some embodiments, end effector 104 comprises one or more suction-based ends (e.g., one or more suction cups). In various embodiments, the end effector may be actuated by one or more of suction, air pressure, pneumatics, hydraulics, or other actuation. Robotic arm 102 and end effector 104 are configured to be used to retrieve parcels or other items that arrive via chute (or bin) 106 and place each item in a corresponding location on segmented conveyor 108 (e.g., a destination location). In this example, items are fed into chute 106 from an intake end 110. For example, one or more human and/or robotic workers may feed items into intake end 110 of chute 106, either directly or via a conveyor or other electro-mechanical structure configured to feed items into chute 106.

In the example shown, one or more of robotic arm 102, end effector 104, and conveyor 108 are operated in coordination by control computer 112. In some implementations, control computer 112 is configured to control a plurality of robotic arms operating at one or more workstations. In various embodiments, a robotic singulation as disclosed herein may include one or more sensors from which an environment of the workspace is modeled. In the example shown in FIG. 1, system 100 includes image sensors, including in this example 3D cameras 114 and 116. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 112 includes an workspace environment state system such as vision system used to discern individual items, debris on the workspace, and each item's orientation based on sensor data such as image data provided by image sensors, including in this example 3D cameras 114 and 116. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm can be used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information pertaining to output from one of the sensor arrays may include information indicating one or more sides of the item comprising an identifier (e.g., a label, etc.).

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 108. In some embodiments, the workspace environment state system produces an output (e.g., sensor data or information otherwise characterizing the workspace and/or items within the workspace) used by the robotic system to detect a state, condition, and/or attribute associated with one or more items in the workspace, and/or a state or condition associated with the robotic arm or other element of the workspace. According to various embodiments, in response to detecting (e.g., determining) the state, condition, and/or attribute associated with one or more items in the workspace, the robotic system implements one or more active measures in connection with singulating an item. As an example, the active measure may include updating the plan to autonomously operate a robotic structure to pick one or more items from the workspace and place each item singly in a corresponding location in a singulation conveyance structure. As an example, the active measure may include updating the plan to include an updated path or trajectory of the item so that the item is moved within a threshold range of one or more sensors in the workspace (e.g., within a line of sight of one or more sensors to allow the one or more sensors to obtain information from an identifier on the item). In some embodiments, the active measure or the updating the plan can include operating the robotic structure to change or adapt to the detected state, condition, and/or attribute (e.g., implement a change in a manner by which an item is singulated, change a path or trajectory along which the item is singulated, change a manner by which the item is grasped, change a location on the item at which the item is grasped, etc.).

In various embodiments, a robotic system as disclosed herein includes and/or does one or more of the following, e.g., by operation of a control computer such as control computer 112:

- Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the tree-dimensional view of the workspace.
- The robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within the same workspace to singulate a plurality of items. For example, in various embodiments, the plurality of robots operate independently to pick and place items. If a risk of collision is detected, responsive action is taken to ensure the plurality of robots do not collide with one another during singulation.
- The robotic system coordinates operation of multiple robots to ensure all items are placed and only one per slot/location. For example, if robot A drops an item system tasks robot B to pick it up; item placed but with improper orientation is picked up and adjusted or moved to another location by same or another robot; two or more items in a single destination slot results in robot downstream station picking one of the two or more items off the conveyor and placing the item in a new location; etc.
- The robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.
- In response to a determination that two robots independently are tasked to acquire the same item, the system picks one at random to get that item and the other moves on to the next item (e.g., identify, select, determine grasp strategy, pick, move according to plan, and place).
- The robotic system can manage the independent operation of a plurality of robots to ensure that the robots select items at different times to avoid the same item being selected for singulation by two different robots.
- Conveyor movement and/or speed controlled as needed to avoid empty locations and achieve a desired robot productivity (throughput) In response to a determination that an item is misplaced or dropped, the system assigns a robot or, if needed, a human worker to pick it up and place back in the retrieving robot's own source pile or, if available or more optimal, on a next open slot on the conveyor.
- Upstream robots controlled to intentionally leave some slots open for downstream robots to place items on the conveyor.
- Downstream robots controlled to correct errors from an upstream placing an item on the conveyor (e.g., to correct the placement of an item that rests in more than one slot/tray, to update a data structure with an association between an identifier for the item with the slot in which the upstream robot placed the item, etc.).
- Downstream sensors may be controlled (or information from such sensors may be obtained) to obtain information pertaining to one or more identifiers on an item being carried on the conveyor.
- A failure or error that cannot be corrected by the same or another robot results in an alert to obtain human (or other robotic) intervention to resolve.
- Move/remove the debris within the workspace, or to reconfigure an item to be singulated (e.g., to improve the likelihood that the item is successfully picked from the source pile/flow and placed on the conveyance structure).
- Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).
- Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.
- Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.
- Use sensor data to determine that the robotic arm has grasped a plurality of items in connection with singulation of one of the items, determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item on the placed in a slot that is adjacent to a slot comprising a tall or large item. As another example, the path for singulating the item may be determined based on a location of an identifier on an item (e.g., a location of the identifier relative to a sensor or scanner in the workspace).

Determine a movement and speed of the robotic arm that singulates an item based at least in part on a speed of a conveyor belt.

Determine a trajectory of the item to be singulated based at least in part on one or more of a characteristic of the item (e.g., a location of an identifier on the item), a characteristic of the workspace environment, a location of a sensor or scanner, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector to be orthogonal to a surface of the item.

Update the ability of the robotic system to detect an empty slot or tray. For example, the definition of an empty slot/tray used by the robotic system to identify an empty slot/tray is updated over time.

In various embodiments, an arbitrary mix of items to be singulated may include parcels, packages, and/or letters of a variety of shapes and sizes. Some items may be standard packages one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score may be computed to estimate the probability of grasp success, and in some embodiments the score is determined at least in part by the degree of overlap/occlusion by other items. Less occluded items may be more likely to be selected, for example, other considerations being equal.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. The robotic system can determine the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause suboptimal suction from the end effector of the robotic arm, and thus the grasping of such an item is suboptimal. According to various embodiments, in response to determining that the item is relatively heavy (e.g., that the weight exceeds a predefined threshold) and that the item is packaged in a poly-bag, or in response to determining that tenting is being caused while gasping the item, the robotic structure performs an active measure to change or adapt to the "tenting" or to the determination that the packaging of the item. As an example, the robotic structure performs an active measure to partially lift the package and drag the package from the chute to the corresponding slot in the conveyance structure.

The robotic system may determine a path or trajectory (or a trajectory of the robotic arm/end effector in approaching the item for grasp) based on a type of packaging of the item in order to avoid tenting or to otherwise improve a grasping of the item. As an example, the robotic arm (e.g., a wrist) and/or the end effector is controlled to be orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras may be used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving the one or more items. The image data can be used to detect debris on the chute or within the workspace, a clog in the chute flow of items through the workspace, a number of items grasped by the robotic structure during singulation of a selected item, a characteristic of one or more items occupying slots on the conveyance structure, etc. In some embodiments, the image data is used to determine a characteristics (e.g., an attribute) of one or more items in the workspace. As an example, the image data can be used in connection with determining (e.g., estimate) a height or dimension of an item. As another example, the image data can be used to obtain information pertaining to an identifier (e.g., a label, etc.) on the item. The image data may be used to determine a side of the item on which the label is comprised.

The multiple cameras serve many purposes, in various embodiments. First they provide a richer full 3D view into the scene. Next they operate in cohesion to minimize the errors due to package shininess when light reflecting off a package and into a camera may disrupt its operation; in this case another camera at a different location provides a backup. In some embodiments, they can be selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package. In embodiments, one or more cameras are mounted on the robotic structure (e.g., on the end effector of the robotic arm, etc.).

Another purpose served by cameras is, in various embodiments, to detect any sort of unforeseen error in robot operation or any disruption to the environment. Cameras placed on the robot and on the environment have different error and accuracy profiles. The cameras on the robot can be more accurate since they are rigidly fixed to the robot but slower to use because use of such cameras require the robot to slow down or stall. Cameras in the environment have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss), to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some embodiments gyros and/or accelerometers on the cameras may be used to filter or compensate for the motion of the mounting base.

According to various embodiments, system 100 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 1, in various embodiments, robotic arm 102 is driven by one or more motors, e.g., one or more motors at each movable joint or mount location. In some embodiments, the work required to drive to robotic arm 102 (e.g., to move the robotic arm as the robotic arm attempts to singulate an item) is indicative of one or more characteristics of the item to be singulated. For example, in some embodiments, a weight of the item may be computed (or estimated) based on the work required to drive the robotic arm 102 while the item is in its grasp. In various embodiments, the work required to drive the robotic arm 102 is measured using a current sensor, a voltage sensor, a power sensor, and/or the like, or some combination thereof. In response to determining the weight of the item during singulation, the robotic system determines a path/trajectory of an item to be singulated based at least in part on the weight of the item. The robotic system may perform an active measure to adapt to the weight of the item such as, for example, updating the path or trajectory in response to determining the weight of the item. In some embodiments, in response to determining that the weight of the item is greater than a predefined threshold, robotic system 100 adjusts the plan to singulate the item via partially picking up the item and dragging the item to the corresponding location on the conveyance structure (e.g., in contrast to wholly picking up the item and moving the arm to place the item on the conveyance structure). In some embodiments, in response to determining the weight of the item, the robotic structure adjusts the speed at which the robotic arm (and the item) is moved. For example, the larger the weight of the item, the greater the shear forces between the item and end effector 104 as the robotic arm 102 is moved. Further, the shear forces can increase as the speed at which the robotic arm is operated (e.g., the speed at which the robotic arm moves the item). Accordingly, robotic system 100 can control the speed of the robotic arm 102 based at least in part on the weight of the item to ensure that the item remains firmly grasped by the robotic arm. Although the description hereof describes the weight being measured based on using a current sensor, a voltage sensor, a power sensor, and/or the like, the weight can also be measured using a force sensor configured in the robotic arm 102 or the end effector 104. However, force sensors are relatively expensive and thus low-level hardware information, such as motor torque or a measure of the work used by the motor is an effective manner by which to determine (e.g., estimate) the weight of the item.

Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays can be used to determine a dimension or size of an item to be singulated and/or another item or object within the workspace. The information received from the one or more sensor arrays may be used in connection with determining a height of the item to be singulated and/or another item or other object within the workspace. In some embodiments, the robotic system determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label. In some embodiments, in response to determining that the ability of the robotic system to obtain information for adjacent items is impeded, the robotic system may implement one or more active measures. The one or more active measures may include performing one or more operations to obtain the information for the item. Examples of the active measure may include using one or more downstream sensors (e.g., an overhead sensor, and/or side sensor, etc.) to capture the information; updating a path/trajectory of the item to include a part of the path where the item is brought within range of one or more sensors (e.g., modify the path to bring the item within a line of sight of a sensor in the workspace, such as based on a modelling of the workspace and likelihood of successful scans relative to location in the workspace, etc.), etc. Various other active measures may be implemented.

Referring further to FIG. 1, in the example shown system 100 further includes an on-demand teleoperation device 118 usable by a human worker 120 to operate one or more of robotic arm 102, end effector 104, and conveyor 108 by teleoperation. In some embodiments, control computer 112 is configured to attempt to move items from the source pile (e.g., the source location) to conveyor 108 (e.g., the destination location) in a fully automated mode. As an example, the control computer 112 is configured to operate robotic arm 104 to pick up the item from the source pile and to move the item in a manner (e.g., along a path/trajectory) that one or more identifiers on the item, or information pertaining to the one or more identifiers, are obtained (e.g., scanned) by one or more sensors within the workspace. However, if after attempting to operate in fully automated mode control computer 112 determines it has no (further) strategies available to have at least one of the identifiers (or information pertaining thereto) obtained by the one or more sensors, in various embodiments control computer 112 sends an alert to obtain assistance from a human operator via teleoperation, e.g., by human operator 120 using teleoperation device 118. Teleoperation device 118 may display one or more images on a user interface, the one or more images corresponding to images of the item or the workspace captured by the vision system (e.g., camera 114, camera 116, one or more other sensors, etc.). The user interface may be configured to allow a human operator 120 to manually input information pertaining to an identifier on the image (e.g., information that is visible in the one or more images), and/or information pertaining to the item.

In some embodiments, control computer 112 is configured to attempt to grasp and place items in a fully automated mode. However, if after attempting to operate in fully automated mode control computer 112 determines it has no (further) strategies available to grasp one or more items, in various embodiments control computer 112 sends an alert to obtain assistance from a human operator via teleoperation, e.g., by human operator 120 using teleoperation device 118. For example, in some embodiments, in response to detecting a state or condition affecting item flow through chute 106, control computer 112 may attempt to perform one or more actions to facilitate singulation. If fully automated attempts to response to the detected state or condition are determined not to have resolved the state or condition, control computer may prompt human operator 120 to address the state or condition, e.g., via teleoperation using on-demand teleoperation device 118. In various embodiments, control computer 112 may display a user interface or other interface that identifies the state or condition and/or presents human selectable options to control the robotic arm 102, end effector 104, and/or other elements and instrumentalities as disclosed herein (e.g., blowers, shakers, chute conveyors, etc.) to alter the state or condition.

In various embodiments, control computer 112 uses image data from cameras such as cameras 114 and 116 to provide a visual display of the scene to human worker 120 to facilitate teleoperation. For example, control computer 112 may display a view of the pile of items in chute 106. In some embodiments, segmentation processing is performed by control computer 112 on image data generated by cameras 114 and 116 to discern item/object boundaries. Masking techniques may be used to highlight individual items, e.g., using different colors. The operator 120 may use the visual display of the scene to identify the item(s) to be grasped and use teleoperation device 118 to control the robotic arm 102 and end effector 104 to pick the item(s) from chute 106 and place each in a corresponding location on conveyor 108. In various embodiments, once the item(s) for which human intervention was prompted have been placed on the conveyor, the system 100 resume fully automated operation. In various embodiments, in the event of human intervention, the robotic system observes the human worker (e.g., manual task completion, task completion using a robotic arm and end effector via teleoperation) and attempts to learn a strategy to (better) complete the task in an autonomous mode in future. For example, the system may learn a strategy to grasp an item, e.g., by observing the places on the item at which a human worker grasps the item and/or by remembering how the human worker used the robotic arm and end effector to grasp the item via teleoperation.

In some embodiments, system 100 invokes assistance from human operator 120 in response to determining that an abnormality in the operation of system 100 exists. An example of an abnormality is a lack of a threshold pressure being attained between end effector 104 and the item during singulation of the item. In response to detecting that the pressure attained between end effector 104 and the item is less than a threshold pressure value, robot system 100 can perform a diagnostics process in connection with assessing whether robot system 100 is performing normally. For example, system 100 can perform a diagnostics of the ability of end effector 104 to engage an item and attain a predetermined threshold pressure value. In response to determining that system 100 is not performing normally (e.g., that the end effector 104 is not able to engage an item and attain a predetermined threshold pressure value), system 100 invokes assistance from human operator 120. In some embodiments, control computer 112 sends an alert to human operator 120. The alert can indicate the basis of the problem (e.g., an indication that the end effector is unable to engage the item and attain a predetermined threshold pressure value). For example, the alert can provide a recommended or requested remedial action to human operator 120.

According to various embodiments, in response to determining that current operation of system 100 deviates from expected normal operation of system 100, system 100 determines to perform a diagnostic on system 100. System 100 can perform the diagnostic on a part of the system 100 that system 100 determines, based at least in part on sensor data (e.g., the current sensor data), is deviating from normal operation or that is within a threshold range or percentage of being in deviation from normal operation. In the case of the measurement of pressure attained by end effector 104 described above, system 100 can determine the particular end effector(s) for which a diagnostic process is to be performed. In some embodiments, in response to performing the diagnostic process and determining a result of the diagnostic process indicates that system 100 (or a component thereof) is deviating from normal operation or is otherwise within the threshold range or percentage of being in deviation from normal operation, system 100 implements one or more active measures. Examples of the active measures include replacing the component (e.g., switching an end effector), determining to operate the system 100 in a manner that does not use the component in deviation of normal operation or that does not place a strain on the component in excess of a predefined strain threshold, and/or invoking human intervention (e.g., notifying human operator 120 of the deviation). Various other active measures can be implemented.

Continuing with the example described above in connection with FIG. 1, system 100 determines to perform a diagnostic process at least partly in response to system 100 determining that system 100 is deviating from normal operation or that the diagnostic process is to be performed in connection with assessing whether a remedial active measure is to be implemented. In response to determining that the pressure attained by end effector 104 while the robotic arm has picked up an item deviates from an expected normal operation of end effector 104, system 100 determines to perform a diagnostic with respect to operation of the end effector (e.g., one or more suction cups on the end effector) that is determined to deviate from normal operation. According to various embodiments, the diagnostic process for performing a diagnostic with respect to an end effector includes operating robotic arm 102 to move to a predetermined location and engage the end effector with a predetermined surface such as, in this example, surface 115. Surface 115 may be located within workspace 110. In some embodiments, surface 115 is a part of chute 106 or is operatively connected to chute 106 or conveyor 108. When the end effector is engaged to the predetermined surface, system 100 controls the end effector to grasp the predetermined surface. In response to controlling the end effector to grasp the predetermined surface, system 100 obtains sensor data pertaining to a measurement of a grasp strength with which the end effector grasps the predetermined surface. For example, in response to engaging the end effector with surface 115, system 100 controls the end effector to apply a suction to surface 115. System 100 obtains sensor data including one or more values of the pressure attained between the end effector and surface 115. System 100 then determines whether the pressure attained by the end effector in grasping surface 115 deviates from an expected normal operation of grasping surface 115. In some embodiments, system 100 compares the sensor data including one or more values of the pressure attained between the end effector and surface 115 with one or more predetermined ranges or threshold values mapped to a normal operation of the end effector. If the pressure attained between the end effector and surface 115 is inconsistent with normal operation of the end effector (e.g., if one or more values of the pressure attained between the end effector and surface 115 falls outside one or more predetermined ranges or threshold values mapped to a normal operation of the end effector), system 110 determines that the end effector is not working properly (e.g., the end effector is deviating from normal operation).

According to various embodiments, in response to system 100 determining that the end effector is not working properly, system 100 updates the plan to implement one or more active measures based at least in part on such determination that the end effector is not working properly. Such an active measure includes alerting human operator 120 that the end effector is not working. For example, system 100 sends a notification to the human operator 120 of the deviation from normal operation. In some embodiments, system 100 provides human operator 120 with one or more recommended active measures. In response to receiving the notification of the deviation from normal operation, the human operator 120 can implement a human intervention to replace or repair the applicable end effector. In some embodiments, human operator 120 controls system 100 using on demand teleoperation device 118 to implement an active measure such as controlling the robotic arm 102 to replace the applicable end effector. In some embodiments, human operator 120 can select at least one of the one or more recommended active measures, and in response to such selection, system 100 controls robotic arm 102 to implement the selected active measure (e.g., without additional human intervention).

In various embodiments, control computer 112 operates robotic arm 102 (or a system associated therewith) to actuate a suction cup on the end effector 104. The end effector 104 may include a plurality of suction cups and the plurality of suction cups may be actuated independently (e.g., independently of another suction cup). For example, the control computer 112 may select one or more suction cups (of a plurality of suction cups on the end effector) to actuate, and may send a signal to the end effector 104 (or the robotic arm or system associated therewith) to actuate the selected one or more suction cups. In some embodiments, the plurality of suction cups includes a plurality of sets of one or more suction cups. A set of one or more suction cups may be actuated independent from another set of one or more suction cups. In some embodiments, each set of one or more suction cups may be actuated independently of the other set(s) of one or more suction cups. A suction cup (or set of one or more suction cups) may be actuated according to a grasping strategy for grasping an item. For example, the control computer 112 may select an item to be grasped, and the control computer 112 may determine a plan to grasp the item such as in connection with picking up the item and placing the item in another location (e.g., a receptacle for a kitting operation, or a tray or segmented conveyor for a singulation operation, etc.).

According to various embodiments, one or more suction cups on the end effector 104 are actuated based at least in part on a grasping strategy. The grasping strategy may be determined by a control computer 112, and the control computer 112 may send one or more signals (e.g., control signals) to an actuation mechanism. In some embodiments, the actuation mechanism controls actuation of at least one of the one or more suction cups on the end effector 104. For example, the actuation mechanism can selectively actuate a first set of one or more suction cups from among a plurality of suction cups on the end effector. The actuation mechanism may be a module running on control computer 112, or a module operatively connected to the robotic arm 102 and/or end effector 104.

Control of a suction cup included on the end effector 104 may include causing the suction cup to move between an inactive position and an active position. In the inactive position, the suction cup may be recessed relative to a bottom of the end effector (e.g., the base plate of the end effector and/or relative to a position of the suction cup in the active position. In some embodiments, if the suction cup is in the inactive position, the suction cup does not engage with an item or other surface when other suction cups included on the end effector are disposed in their corresponding active positions. Conversely, in the active position, the suction cup may be extended relative to the bottom of the end effector 104 and/or relative to a position of a suction cup in the inactive position. According to various embodiments, a set of suction cups on the end effector 104 may be selectively controlled to engage an item such as in connection with grasping the item. Selective control of the set of suction cups may include controlling a first set of suction cups to move to an active position and/or controlling a second set of suction cups to move to an inactive position. The first set of suction cups may be actuated to generate a pressure force between at least one of the first set of suction cups and the item to be grasped.

Although the example described in connection with a singulation operation (e.g., the use of robotic arm 102 to singulate an item from chute 106 to a position on conveyor 108), various embodiments include a robotic arm that performs a kitting operation. For example, the robotic arm including end effector 104 (e.g., which may include one or more suction cups) may be used to pick one or more items from corresponding determined locations (e.g., from a tray on a shelf) and arrange or assemble the items to form a kit (e.g., including placing the items in a box, tray, or other receptacle). The kit may be formed based at least in part on an order (e.g., an order received via an electronic commerce website).

According to various embodiments, a set of paths or trajectories for singulating an item is determined, and the path or trajectory along which the item is to be singulated is selected from the set of paths or trajectories. The path or trajectory can be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

According to various embodiments, a robotic singulation system performs an active measure in order to improve the singulation of an item (e.g., to successfully pick the item from a source pile/flow and place the item on the conveyor). The robotic system dynamically updates the path or trajectory of the item during singulation based on a context of the workspace (e.g., a state or condition of the item, a property of the item, another item within the workspace, etc.). For example, in response to determining that a detected state or condition impedes implementation of a current plan to autonomously operate the robotic structure to pick one or more items from the workspace and place each item singly in a corresponding location in a singulation conveyance structure, the robotic structure performs one or more active measures to improve the likelihood of successful singulation (e.g., the robotic structure can determine an active measure that is expected to improve the likelihood of successful singulation based at least in part on the detected state or condition). In some embodiments, the active measure includes using a robotic arm, an end effector of the robotic arm, a movement of a chute or other element of the workspace, or an air blower to reconfigure the source pile/flow or to reconfigure one or more items or debris on the workspace. The active measure can be performed to improve a scanning of a label or identifier on an item to be singulated, to improve the likelihood that an item can be picked up, to improve the grip on an item being singulated, to improve the release of an item from the robotic arm, or to improve operation of two robotic arms that are independently singulating items from the same workspace (e.g., the same source pile/flow).

Figure 2A:
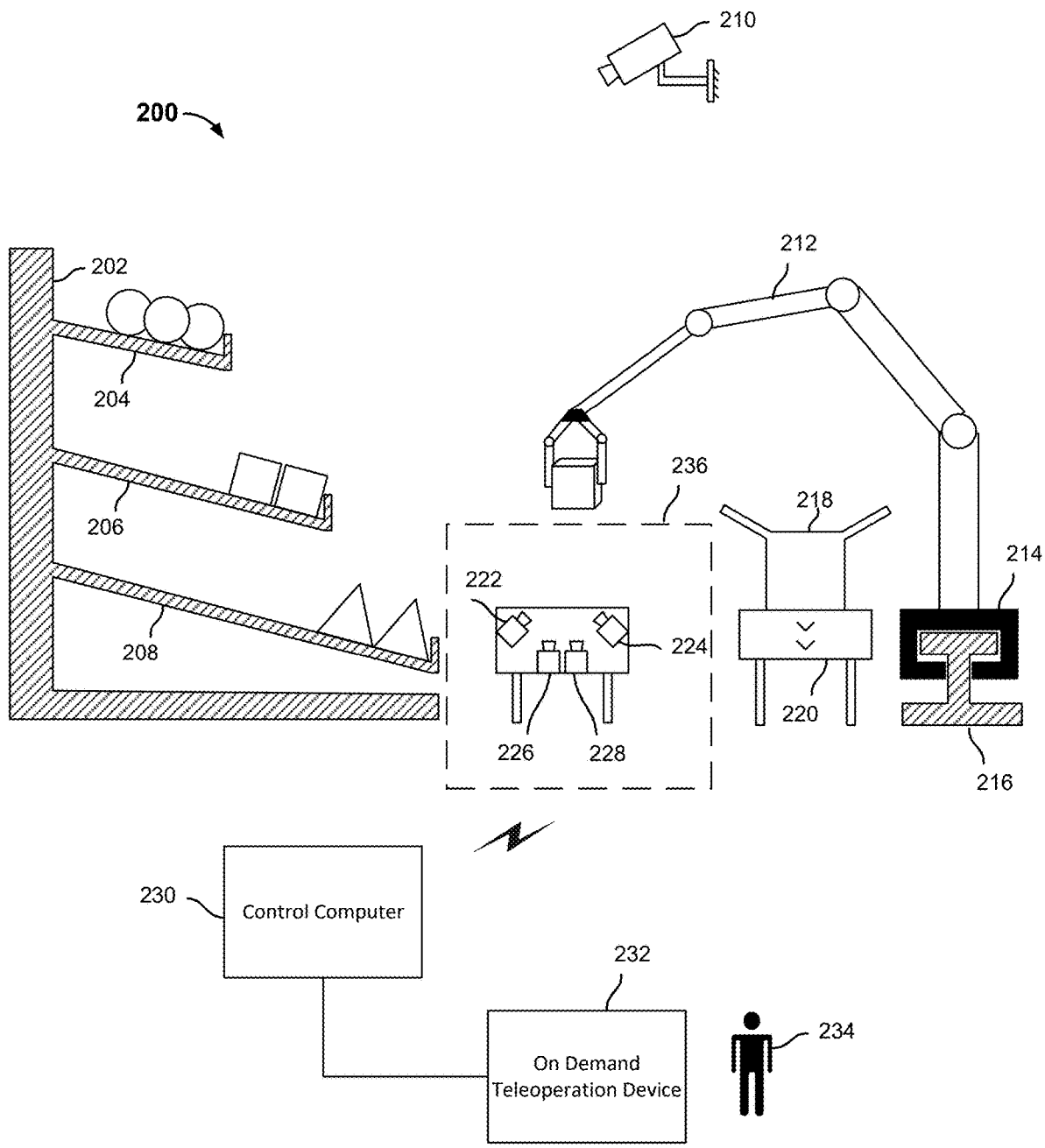
FIG. 2A is a diagram illustrating a kitting system according to various embodiments.

FIG. 2A is a diagram illustrating a kitting system according to various embodiments.

In the example shown, kitting system 200 includes a kitting shelf system 202 and a robotic arm 212. In some embodiments, a kitting system includes a plurality of kitting shelf systems and/or a plurality of robotic arms. The robotic arm may operate autonomously to pick an item (or an object from within an item) from a kitting shelf system and place the item (or object) to a predetermined location. In some embodiments, a robotic arm picks and places one or more items to a predetermined location based at least in part on a plan such as a plan for kitting the one or more items (e.g., to assemble a kit based on an order etc.).

In some embodiments, robotic arm 212 is movable with respect to kitting shelf system 202 and/or with respect to a conveyor or other location at which a receptacle is disposed. In the example shown in FIG. 2A, robotic arm 212 is mounted on carriage 214, which is configured to ride along a rail or other linear guide 216 disposed alongside and substantially parallel to the conveyor 220. As an example, the robotic arm 212 may be mounted on a side opposite the kitting shelf system 202. As an example, the robotic arm 212 may be mounted on a same side as the kitting shelf system 202. In some embodiments, one or more robotic arms are mounted on a same side of conveyor 220 as a kitting shelf system and one or more robotic arms are mounted on a side of conveyor 220 that is opposing to kitting shelf system. In various embodiments, a motor, belt, chain, or other source of motive force is applied via a controller (not shown in FIG. 2A) to move the carriage 214 and attached robotic arm 212 along the rail or guide 216 to facilitate the automated retrieval of items from one or more kitting shelf systems, and the placement of items in a receptacle (e.g., box, a tray, etc. such as receptacle 218) as the receptacle is moved along conveyor 220. Control of robotic arm may be coordinated based at least in part on one or more items to be picked and placed in receptacle 218, a location of receptacle 218 (e.g., a predetermined location at which the item is to be kitted), and/or a path of receptacle 218 (e.g., based on a determined movement of conveyor 218).

In some embodiments, kitting system 200 includes control computer 230 and/or on operation teleoperation device 232. In the example shown, operation of kitting shelf system 202, conveyor 220; and robotic arm 212, and/or carriage 214 are operated in a coordinated manner under the control of control computer 230. In the example shown, control computer 230 is in communication (e.g., wireless communication) with controllers, not shown in FIG. 2A, each configured to control operation of a corresponding element comprising kitting system 200, e.g., kitting shelf system 202; robotic arm 212, conveyor 220, carriage 214, and/or receptacle source (not shown). Although wireless connections are shown in FIG. 2A, in various embodiments wired connections or a combination of wired and wireless connections may be used.

In the example shown in FIG. 2A, robotic arm 212 has an end effector corresponding to a two-digit gripper. In various embodiments, robotic arm 212 includes one or more other and/or different types of end effectors/retrieval tool, including without limitation a gripper having three or more digits; a gripper having digits with different attributes than as shown, e.g., cushioned digits, smaller digits, larger digits, etc.; and/or a retrieval tool that is not a gripper, such as one configured to pick up items using suction, friction, electrostatic force, magnetic force, etc. In some embodiments, the gripper of robotic arm 212 may be interchanged with one or more different end effectors, depending on one or more attributes of an item to be retrieved, e.g., weight, fragility, compressibility, rigidity, size, shape, etc. In some embodiments, the gripper of robotic arm 212 may be used to retrieve and use different end effectors (e.g., gripper-held tools) to pick and place items, depending on one or more attributes of the item to be retrieved, for example. One or more attributes of the items may be determined based at least in part on information obtained from one or more sensors such as camera 210.

In various embodiments, control computer 230 is configured, e.g., by software running on control computer 230, to receive data associated with an invoice, order, part list, pick list, or other list of items to be retrieved and packed together; determine a strategy/plan to fulfill the retrieve and pack the required items; and operate elements of kitting system 200, e.g., kitting shelf system 202; conveyor 220; and robotic arm 212 and/or carriage 214, in coordination to fulfill the requirement(s). In some embodiments, kitting system 200 includes a plurality of kitting shelf systems and/or a plurality of robotic arms, and one or more control computers are controlled to coordinate/operate elements of kitting system 200.

In some embodiments, control computer 230 is configured to receive a list of items to be packed. Control computer 230 may determine which items are associated with which of kitting shelf systems (or which items are associated with a particular shelf of a kitting shelf system such as kitting shelf system 202) and may determine a plan to retrieve and pack the items. In some embodiments, control computer 230 controls a box assembly machine (not shown) or a receptacle source module, and deposit a receptacle on conveyor 220 and controls the conveyor 220 to advance the receptacle to a position to be loaded with a first one or more items. Control computer 230 may control the carriage 220 and/or robotic arm 212 to position the robotic arm 212 to retrieve the first one or more items from the associated a kitting shelf system. Control computer 230 may control kitting shelf system 202, e.g., to ensure the require item(s) in the required quantities are present in the pickup zone (e.g., a presentation face) at the end of kitting shelf system 202 (or a shelf of kitting shelf system 202) nearest to the conveyor 218 and robotic arm 212. Control computer 230 controls robotic arm 212 to retrieve the item(s) from the corresponding pickup zone(s) and places the item(s) in the receptacle (e.g., receptacle 218) before moving on to perform coordinated retrieval and packing of any further items required to be included in that particular kit. In response to a determination that all items have been retrieved and packed (e.g., according to a plan for kitting one or more items), control computer 230 controls conveyor 220 to advance the receptacle (e.g., receptacle 218) to a next stage of fulfillment, not shown in FIG. 2A (e.g., a station at which the box is sealed, labeled, and sent to be shipped).

According to various embodiments, kitting system 200 comprises one or more sensors in the workspace. For example, kitting system may include one or more cameras, bar code scanners, RFID scanners, infrared scanners, and/or 3D scanners, etc. As illustrated in FIG. 2A, kitting system 200 may include one or more cameras such as camera 210.

A subset of the one or more cameras may have a line of sight to the kitting shelf system 202 and/or one or more items on a shelf of kitting shelf system 202. In some embodiments, kitting system 200 comprises sensor 222, sensor 224, sensor 226, and/or sensor 228. Sensor 222, sensor 224, sensor 226, and/or sensor 228 may be configured in a sensors array. Sensor 222, sensor 224, sensor 226, and/or sensor 228 may be configured to capture information (e.g., machine readable information from an item).

The sensors in the workspace (e.g., camera 210) may capture information pertaining to one or more items on at least one shelf of the kitting shelf system 202. For example, information pertaining to an identifier (e.g., machine readable information) on at least one side of the item may be obtained from by the sensors. The one or more identifiers on the items may be used by kitting system 200 in connection with determining that the item has been kitted (e.g., retrieved from kitting shelf system 202 and placed in the receptacle 216), in connection with confirming fulfillment of at least part of a corresponding order (e.g., an order for which item is a constituent part), and/or a determination of whether to replenish kitting shelf system 202 with items (e.g., an item that is a type of item corresponding to the one or more identifiers of an item removed from kitting shelf system by robotic arm 212). The information pertaining to the one or more identifiers on an item may be obtained while the item is on the kitting shelf system 202 (e.g., on a presentation face of a shelf) and/or while the item is being moved by the robotic arm from kitting shelf system 202 to receptacle 216. For example, robotic arm 212 may move an item along a path/trajectory that is determined based at least in part on the item (e.g., a size of the item, a type of the item, a location or expected location of one or more identifiers on the item) and/or a location of one or more sensors within the workspace, such as a barcode scanner, a RFID scanner, etc. The path/trajectory may be predetermined and defined or otherwise specified in a plan such as a plan for kitting the one or more items (e.g., to assemble a kit based on an order etc.). In some embodiments, the path/trajectory is determined based at least in part on a condition that the item is moved through a threshold area or threshold range of one or more sensors. For example, the path/trajectory is determined so that at least one side of the item is moved within the line of sight of at least one sensor.

According to various embodiments, as robotic arm 212 moves an item from kitting shelf system 202 to a receptacle (e.g., receptacle 218 on conveyor 220, etc.) one or more of sensor 222, sensors 224, sensor 226, and/or sensor 226 obtain information pertaining to the item if the item is brought within range/sight of the sensors. For example, sensor 222, sensors 224, sensor 226, and/or sensor 226 may obtain information pertaining to one or more identifiers on the item. The information pertaining to the one or more identifiers may be machine readable information that a computer (e.g., control computer 230) can process and determine information pertaining to the item such as a type of item, a manufacturer, a serial number, a model number, a brand, a lot number, etc. Kitting system 200 may comprise a sensor array comprising sensors arranged to capture information from different angles/lines of sight. For example, sensor 226 and/or sensor 228 may be positioned to have a line of sight upwards (e.g., substantially perpendicular to the ground), and sensor 226 and/or sensor 228 may obtain information corresponding to an identifier on a bottom surface of the item. As another example, sensor 222 and sensor 224 may be positioned at a different angle than sensor 226 and/or sensor 228. Sensor and/or sensor 224 may be positioned to be angled at a forty-five degree angle relative to the ground. Sensor 22 and/or sensor 224 may be positioned to have a line of sight of at least a side of the item (e.g., a side surface of the item different from the bottom surface of the item that is scanned by sensor 226 and/or sensor 228). In some embodiments, kitting system 200 includes camera 210 configured to obtain information corresponding to one or more identifiers on a top surface of the item while the item is on a shelf of kitting shelf system 202; a sensor (e.g., sensor 226 and/or sensor 228) configured to obtain information corresponding to one or more identifiers on a bottom surface of the item while the item is moved (within range/sight of the sensor) from the kitting shelf system 202 to the receptacle; and a sensor (sensor 222 and/or sensor 224) configured to obtain information corresponding to one or more identifiers on one or more side surfaces of the item (e.g., a surface that is substantially perpendicular to the ground) while the item is moved (within range/sight of the sensor) from the kitting shelf system 202 to the receptacle.

According to various embodiments, a plan for moving an item from the kiting shelf system 202 to a receptacle (e.g., the plan to retrieve and pack the item) comprises a path or trajectory along which robotic arm 212 is to move the item. The path along which the robotic arm 212 is to move the item may be determined based at least in part on a location of one or more sensors (or sensor arrays) within workspace such as sensors 222, 224, 226, and 228. For example, the path may be determined to include moving the item within a threshold range or threshold area of one or more sensors. The threshold range or threshold area may be a defined location or area within which at least one sensor can obtain information from an identifier on an item. As an example, in the case of an RFID scanner, the threshold range or threshold area may be based at least in part on a proximity within which the RFID scanner can obtain information from an RFID tag on an item. As another example, in the case of a barcode scanner, the threshold range or threshold area may correspond to a distance within which the barcode scanner can obtain information from a barcode on the item. As illustrated in FIG. 2A, as an item is moved through threshold range or threshold area 236, information pertaining to the item (e.g., the identifiers on the item) may be obtained by sensor 222, sensor 224, sensor 226, and/or sensor 228. Accordingly, the plan may be determined to include a path of the item along which the item is moved through at least part of threshold range or threshold area 236. In some embodiments, kitting system 200 stores a mapping of the threshold range or threshold area 236 to the workspace (e.g., control computer 230 stores a definition of boundaries of the threshold range or threshold area 236). In some embodiments, the threshold range or threshold area 236 is mapped on a sensor-by-sensor basis (e.g., each sensor can be mapped to a threshold range or threshold area).

In some embodiments, determining the plan to kit (or singulate) the item may include determining a manner of picking and placing the item that optimizes the likelihood that the identifier will be read by a sensor within the workspace. Based on the location of one or more sensors within the workspace, the robotic system can determine a side of the item that includes the label, determine a side by which to grasp the item, and a path/trajectory along which the item is to be singulated to expose the label on the item to the one or more sensors (e.g., the vision system or other sensor array such as a barcode reader). In some embodiments, the path is determined based at least in part on a likelihood that at least one of the one or more identifiers will be scanned (or information pertaining to such identifier(s) will be obtained) by the one or more sensors such as sensors 222, 224, 226, and/or 228. The determining the path in a manner to optimize the likelihood that one or more labels or identifiers will be exposed to one or more sensors includes determining a set of paths along which the item may be moved and corresponding probabilities that a label or identifier on the item would be scanned if the item were moved along that path, and selecting the path that has a highest corresponding probability. In some embodiments, a path having a corresponding probability that exceeds a threshold probability, or that is within a predefined percent or number of the set of paths having the highest corresponding probabilities is determined. In some embodiments, a path and corresponding probability that the label or identifier on the item would be scanned if the item were moved along such path are determined, and the probability is compared to a predefined threshold for a minimum desired probability. In response to determining that the probability corresponding to a particular path does not exceed the predefined threshold for a minimum desired probability, a new path and corresponding probability are determined. The robotic system can continue to iterate determining the path and corresponding probability until the robotic system determines that the corresponding probability exceeds the predefined threshold for a minimum desired probability. The determining the path may comprise weighting different factors and maximizing a composite score pertaining to the weighted values of the different factors. The different factors may include a likelihood that the one or more identifiers are obtained, the likelihood of success for picking and placing the item, an expected time to pick and place the item if the item were moved along the corresponding path, the presence/location of another object within the workspace (e.g., another robotic arm, a receptacle, another item, etc.), etc.

According to various embodiments, in response to obtaining information pertaining to an identifier on the item, control computer 230 updates a data structure storing a mapping for information pertaining to an item. The mapping may correspond to a mapping of identifier(s) or items to an order, a mapping of identifier(s) or items to a receptacle, a mapping of identifiers or items to a kitting shelf system (or a particular shelf of the kitting shelf system). The information pertaining to an identifier on the item (that is obtained by the one or more sensors) can be used in connection with determining completion of fulfillment of an order, and/or determining that the kitting shelf system 202 is to be replenished. The information pertaining to an identifier on the item (e.g., label, barcode, QR code, etc.) may be scanned by a sensor. The identifier of the item may be used to look up an attribute of the item such as a size of the item, weight of the item, an indication that the item is fragile, a type of packaging, etc. The attribute of the item may be used in connection with determining/updating a packing or gripping strategy, and/or a packing strategy (e.g., an arrangement in the receptacle according to which the item(s) is to be packed), etc.

While a "kitting" operation is shown in FIG. 2A and described herein with reference to FIG. 2A and other Figures, in various embodiments kitting systems (and kitting shelf systems) and integrated systems as disclosed herein may be used to perform the reverse operation, e.g., by stocking shelves, bins, and/or kitting machines with items removed from an initially full or partly full box of items. For example, in the example shown in FIG. 2A, the receptacle 218 may include a plurality of items associated with kitting shelf system 202, and robotic arm 212 may be used to remove items from the receptacle 218 and place the items on the kitting shelf system 202, e.g., from the back or supply end as shown. In some embodiments, a robotic arm provides items (e.g., stocks items) to a feeder portion of a shelf or a feeder portion of a kitting shelf system.

In some embodiments, items on a kitting shelf system, such as kitting shelf system 202, or on a shelf accessed by, or comprised in, a kitting system as disclosed herein, may be bins or trays that comprise objects that are to be "kitted". In some embodiments, the system (e.g., kitting system 200 of FIG. 2A) is configured to detect, e.g., based on computer vision or other sensors and/or techniques, that a bin is empty, and to clear the bin from the kitting system or shelf by using a robotic arm to pick up the bin and place the bin in a corresponding empty bin location (e.g., a nearby stack of empty bins, etc.). In some embodiments, automated bin clearing makes room from a next bin that is not empty to move into position on the kitting machine or shelf to enable a robotic arm to access and pick up items from the bin. In some embodiments, in response to determining that a bin/tray is empty, a robotic arm (e.g., robotic arm 212) removes the bin/tray from the corresponding shelf of kitting shelf system 202 and uses the empty bin/tray as a subsequent receptacle for kitting other items/objects. For example, robotic arm 212 can pick up an empty bin/tray from a shelf and place the empty bin/tray on conveyor 220 for use as a receptacle (e.g., receptacle 218).

In various embodiments, a robotic system as disclosed herein includes and/or does one or more of the following, e.g., by operation of a control computer such as control computer 230:

Computer vision information is generated by merging data from multiple sensors, including one or more of 2D cameras, 3D (e.g., RGBD) cameras, infrared, and other sensors to generate a three-dimensional view of a workspace that includes one or more kitting shelf systems (which may correspondingly include one or more shelves of the kitting shelf system). The robotic system determines characteristics of items and/or debris or other abnormalities in the tree-dimensional view of the workspace.

Robotic system coordinates operation of multiple robots to avoid collisions, getting in each other's way, and contending to pick up the same item and/or place an item in the same destination location (e.g., receptacle on the conveyor) as another robot. The robotic system coordinates operation of a plurality of robots operating within a same workspace to perform kitting with respect to a plurality of items/object (e.g., to kit items in different receptacles or within a same receptacle). As an example, in various embodiments, the plurality of robots operate independently to pick and place items. As another example, the plurality of robots operate to independently pick and place items for different orders (e.g., to place different sets of items in different receptacles). If a risk of collision is detected, responsive action is taken to ensure the plurality of robots do not collide with one another during singulation.

Robotic system coordinates operation of multiple robots to ensure all items are placed in corresponding receptacles. For example, if robot A drops an item system tasks robot B to pick it up; item placed but with improper orientation is picked up and adjusted or moved to another location by same or another robot; two or more items for different orders are placed in a single receptacle results in a downstream robot picking one of the two or more items from the receptacle and placing the item in a new receptacle; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for kitting items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system can manage the independent operation of a plurality of robots to ensure that the robots select items at different times to avoid the same item being selected for singulation by two different robots.

Conveyor movement and/or speed controlled as needed to achieve a desired robot productivity (throughput) and to permit sufficient time for the robot to place an object into the desired receptacle.

In response to a determination that an item is misplaced or dropped, the system assigns a robot or, if needed, a human worker to pick the misplaced item up and place the item back in the applicable kitting shelf system (e.g., on a shelf such as via the feeder portion) or, if available or more optimal, on a receptacle on the conveyor.

Upstream robots controlled to intentionally leave some receptacles open for downstream robots to place items on the conveyor (e.g., in the corresponding receptacles).

Downstream robots controlled to correct errors from an upstream placing an item in a receptacle on the conveyor (e.g., to correct the placement of an item that rests in more than one receptacle such as a tray, or that rests on the conveyor rather than the applicable receptacle, to update a data structure with an association between an identifier for the item or kit/order with the receptacle in which the upstream robot placed the item, etc.).

Failure that cannot be corrected by same or another robot results in an alert being communicated to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or to reconfigure an item to be kitted (e.g., to improve the likelihood that the item is successfully picked from the shelf, or the presentation face of the shelf, and placed on the conveyor such as in a receptacle on the conveyor).

Use sensor data from the workspace environment state system to detect one or more characteristics (e.g., attributes) of the item selected for kitting, determine that grasping or releasing of the item is expected to improve in response to implementation of an active measure, and implement the active measure to improve the grasping or releasing of the item.

Use sensor data to determine that the robotic arm has grasped a plurality of items in connection with kitting of one of the items, determine a plan for releasing the plurality of items in order to place each item singly in a corresponding location in one or more receptacles on the conveyor or to place one of the items back on the shelf/presentation face of the kitting shelf system (e.g., determine a strategy for operating the end effector to release a first subset of the plurality of items at a different time from a second subset of the plurality of items).

Select a path for kitting an item to a receptacle on the conveyor based on an attribute of the item (e.g., a size of the selected item, a weight of the item, etc.) and/or one or more attributes (e.g., characteristics) of an item within a receptacle on the conveyor.

Select a path for kitting an item to a receptacle on the conveyor based on an identifier on the item (e.g., a type of identifier, a location of the identifier, etc.) and/or one or more sensors within the work space (e.g., a location of a sensor, a range of a sensor, a type of sensor, etc.).

Determine a movement and speed of the robotic arm that picks an item from the kitting shelf system and places the item in the applicable receptacle based at least in part on a speed of a conveyor belt.

Determine a trajectory of the item to be kitted based at least in part on one or more of a characteristic of the item, a characteristic of the workspace environment, and/or a characteristic of the conveyor (e.g., a speed of the conveyor belt).

Determine a probability of successful kitting corresponding to one or more paths/trajectories of an item to be kitted, and select a path/trajectory along which the item is to be kitted based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector be orthogonal to a surface of the item.

Update the ability of the robotic system to detect an empty receptacle. For example, the definition of an empty receptacle used by the robotic system to identify an empty receptacle is updated over time.

Controlling the robotic arm to change an orientation of the item while moving the item from the kitting shelf system to the receptacle (e.g., rotating the wrist of the robotic arm to rotate the item while the item is being moved within a threshold range of a sensor, etc.).

Controlling the robotic arm to iteratively move the item within a threshold range of a sensor to ensure that all the identifiers on the item are obtained (or a requisite set of identifiers is obtained).

According to various embodiments, kitting shelf system 202 includes one or more shelves (e.g., shelves 204, 206, and 208). Each of the one or more shelves may be an integrated unit comprising a side at which items are populated onto the shelf, and a side at which items may be picked up by the robotic arm 212. In some embodiments, at least one of the shelves comprises a gating structure that controls the flow of items to an area in which the items are picked up by the robotic arm 212. For example, a shelf may comprise a presentation face. The presentation face corresponds to an area or surface on which an item is disposed on the kitting shelf system. In connection with kitting of one or more items, robotic arm picks an item (or object from within an item) from at least one presentation face. Kitting shelf system 202 (or a shelf comprised in kitting shelf system 202) may include one or more feeder portions. In some embodiments, kitting shelf system 202 includes a gate structure that is configured to control conveyance of an item from a feeder portion to the corresponding presentation face. The gate structure may be coupled to, or integrated with, the presentation face. In some embodiments, kitting shelf system 202 comprises one or more shelves for which a presentation face is integrated with a corresponding feeder portion (e.g., the presentation face may be static and not movable relative to the feeder portion).

According to various embodiments, the gate structure permits or prevents an item to flow from a feeder portion to the presentation face. The control of flow of items from the feeder portion to the presentation face may prevent items from being cluttered on the presentation face and can assist with providing sufficient space and order of items on the presentation face for a robotic arm to pick and place an item/object from the presentation face. The gate structure may be configured to prevent/inhibit more than a threshold of items to be disposed on a presentation face at any particular time. In some embodiments, the gate structure is toggled (e.g., moved) between an open position and a closed position. As an example, the open position may correspond to an orientation of the gate structure when no item is present on the presentation face. As another example, the open position may correspond to an orientation of the gate structure when a quantity of items on the presentation of items is less than a threshold number of items. As another example, the open position may correspond to an orientation of the gate structure when a weight on (or force applied to) to the presentation face is less than a threshold weight (or threshold force). When the gate structure is oriented in the open position, a flow or conveyance of an item from the feeder portion to the presentation face may be permitted (e.g., unblocked). Conversely, when the gate structure is oriented in the closed position, a flow or conveyance of an item from the feeder portion to the presentation face may be prevented (e.g., the flow of items is blocked).

In some embodiments, a presentation face of a shelf is movable. For example, the presentation face toggles between an empty position and an occupied position. The presentation face may be oriented in any one of the plurality of positions/orientations based at least in part on a context of the workspace (e.g., an item to be provided on the presentation face, a location of a robotic arm to pick the item, a size of the robotic arm, a location of a sensor or camera, etc.).

In various embodiments, the empty position corresponds to a position at which the presentation face is oriented to facilitate a flow/conveyance of one or more items from the feeder portion to the presentation face. For example, the empty position may correspond to a position at which the presentation face is oriented when a quantity of items on the presentation face is less than a threshold number. As another example, the empty position corresponds to a position at which the presentation face is oriented when the presentation face is empty (e.g., does not have any items disposed thereon). As another example, the empty position corresponds to a position at which the presentation face is oriented when a weight on (or force applied to) the presentation is less than a threshold weight (or threshold force). In some embodiments, each presentation face in a particular kitting shelf system (e.g., kitting shelf system 202) may have a same angle of orientation (e.g., such as an angle relative to a normal to the ground) when orientated in corresponding empty positions. In some embodiments, two or more presentation faces in a particular kitting shelf system (e.g., kitting shelf system 202) have different angles of orientation (e.g., such as an angle relative to a normal to the ground) when orientated in corresponding empty positions. The configuring of shelves (e.g., presentation faces) at different angles may permit a better line of sight for sensors in the workspace, such as camera 212, and such a configuration may improve the information pertaining to the workspace (e.g., identifiers on the items may be obtained more easily or accurately, etc.).

In various embodiments, the occupied position corresponds to a position at which the presentation face is oriented to facilitate picking of one or more items (e.g., by the robotic arm) from the presentation face. The presentation face may be oriented in the occupied position when conveyance/flow of one or more items from the feeder portion to the presentation face is to be prevented. In some embodiments, each presentation face in a particular kitting shelf system (e.g., kitting shelf system 202) may have a same angle of orientation (e.g., such as an angle relative to a normal to the ground) when orientated in corresponding empty positions. In some embodiments, two or more presentation faces in a particular kitting shelf system have different angles of orientation (e.g., such as an angle relative to a normal to the ground) when orientated in corresponding occupied positions. As an example, a first set of one or more presentation faces has an angle of orientation that is different from an angle of orientation of a second set of one or more presentation faces. As another example, each presentation face within a particular kitting shelf system has a different angle of orientation (e.g., such as an angle relative to a normal to the ground) when orientated in corresponding occupied positions. The configuring of shelves at different angles may permit a better line of sight for sensors in the workspace, such as camera 212, and such a configuration may improve the information pertaining to the workspace (e.g., identifiers on the items may be obtained more easily or accurately, etc.).

In some embodiments, the orientation of the presentation face may have a greater tilt downwards the lower the corresponding shelf is to the ground. Such an orientation of the presentation face may enhance one or more sensors (e.g., camera 210212 to obtain information pertaining to the presentation shelf or one or more items/objects on the presentation face. In addition, such an orientation may enhance the ability of the robotic arm to engage an item with the end effector of the robotic arm. A robotic arm may have limitations with respect to its wrist extension capabilities/configurations and/or its wrist flexion capabilities/configurations. As an example, the orientation of the presentation face (e.g., at least in the occupied position) is configured based at least in part on an extent of wrist extension that is required by a robotic arm to pick the item/object from the presentation face). The shelf/presentation face may be configured based at least in part on the range of motion of a wrist of a robotic arm in the kitting shelf system (e.g., a range of motion with respect to wrist extension/flexion). An end effector or wrist component of the robotic arm may have size limitations that inhibit the ability of the robotic arm to engage (e.g., at certain angles and heights/locations) an item disposed on a presentation face. Accordingly, the orientation of the presentation face (e.g., at least in an occupied position) of a shelf may be configured to improve the likelihood/ability of the robotic arm to configure its position to engage an item/object on the presentation face with an end effector of the robotic arm at an orthogonal relative to the item/object. The orientation of the presentation face when in the occupied position can correspond to an orientation in which a tray/item disposed thereon is optimally angled (at each level/shelf) for a better vision from an onboard camera (e.g., a camera disposed in the workspace and/or on a robotic arm or chassis thereof). In some embodiments the orientation of the presentation face in the empty position and/or occupied position is based at least in part on a configuration of the corresponding gate structure. For example, if the gate structure is a hinge, the orientation of the presentation face in the empty position and/or occupied position is based at least in part on a range of motion of the hinge.

According to various embodiments, kitting shelf system 202 includes one or more feeder portions. In some embodiments, the kitting shelf system 202 may have a single feeder portion that conveys one or more items to a plurality of presentation faces. In other embodiments, the kitting shelf system 202 has a single feeder portion for each presentation face (e.g., a one-to-one mapping of feeder portions to presentation faces). The feeder portion may be configured to convey an item to a presentation face. As an example, the conveyance of the item may be passive such as via gravity acting on an item disposed on the feeder portion (e.g., in the case that the feeder portion is configured to tilt towards the presentation face). As another example, the conveyance of the item may be at least partially active based on the feeder portion being configured with a conveyor that carries an item from an input location of the feeder portion to the presentation face. In various embodiments, the feeder portion configured to receive a succession of items on a receiving end (e.g., an input to the feeder portion) and convey the items to a destination end (e.g., an end that is operatively connected/coupled to a presentation face or that otherwise exits the feeder portion to the applicable presentation face). The succession of items may be manually loaded to the feeder portion or kitting shelf system (e.g., via a human operator 228), or the succession of items may be automatically loaded to the feeder portion (e.g., via a robotic arm/component, or based at least in part on the feeder portion being coupled to a chute that conveys items from a source flow/pile).

Figure 2B:
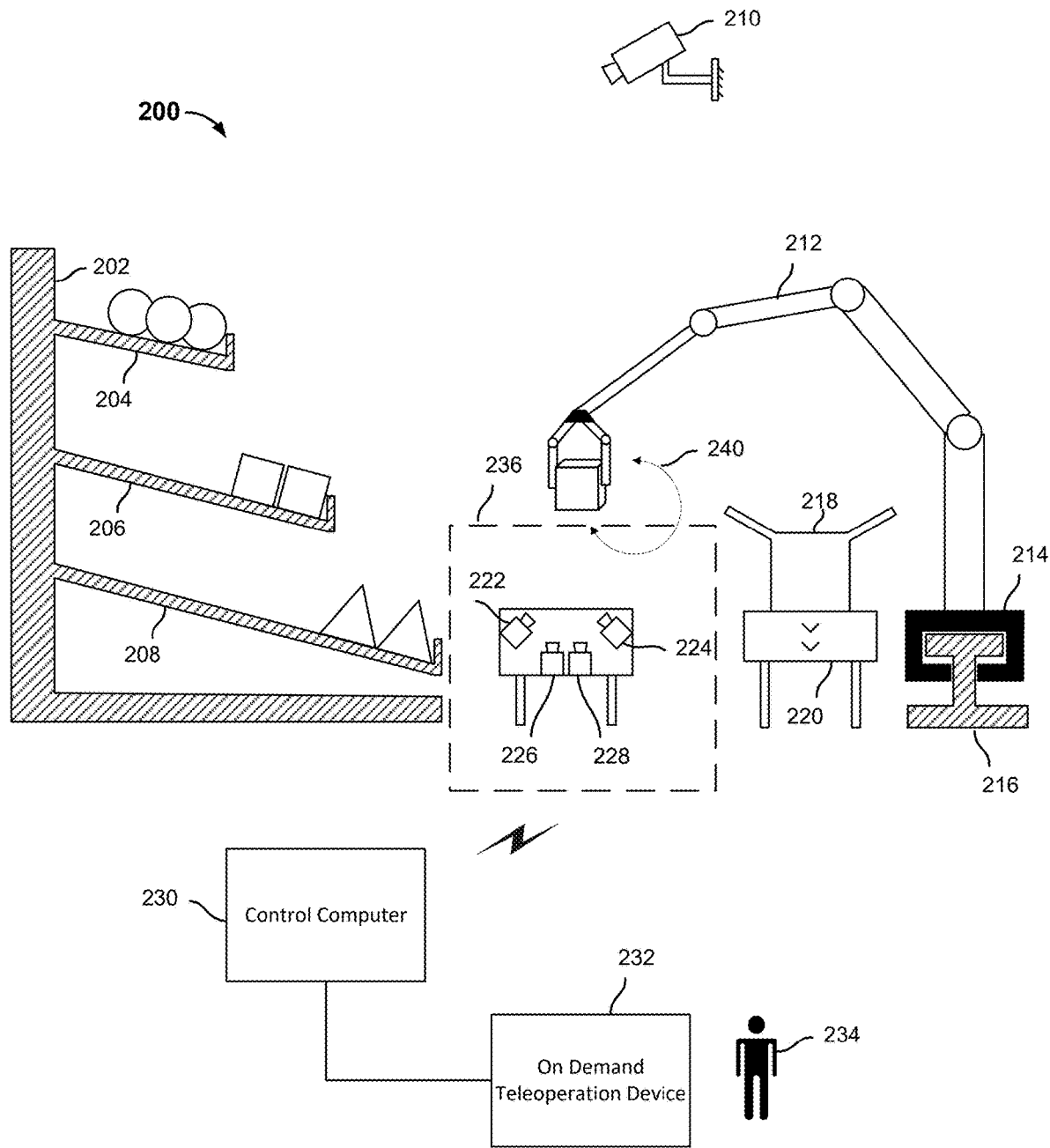
FIG. 2B is a diagram illustrating a kitting system according to various embodiments.

FIG. 2B is a diagram illustrating a kitting system according to various embodiments.

According to various embodiments, the robotic arm 212 moves item from kitting shelf system 202 to receptacle 218 in a manner that improves the likelihood that at least one identifier on the item is obtained/scanned by one or more sensors in the workspace (e.g., sensor 222, sensor 224, sensor 226, and/or sensor 228). For example, as denoted by reference 240 in FIG. 2B, the robotic arm may rotate item. Rotating the item may improve the likelihood that an identifier on a side surface of the item (e.g., a surface that is adjacent to the bottom surface of the item) is scanned by the sensors. The item may be rotated when the item is within the threshold range/threshold area 236. In some cases, the item may be rotated 360 degrees (or continually rotated when the item is within the threshold range/threshold area 236). In other cases, the item may be rotated based at least in part on a range of motion of the robotic arm 212 (e.g., a wrist of the robotic arm) and/or an attribute of the item.

In some embodiments, robotic arm 212 moves the item along a predetermined path. The path includes at least a segment in which the item is moved within at least part of the threshold range/threshold area 236. The robotic system (e.g., control computer 230) may determine a location of the robotic arm 212 (or the item being moved by the robotic arm 212) within workspace and/or relative to one or more sensors such as sensors sensor 222, sensor 224, sensor 226, and/or sensor 228. The robotic arm may cause the item (e.g., the item within its grasp) to rotate based at least in part on the location of the robotic arm 212 and/or item. For example, in response to determining that the robotic arm 212 and/or item is within the threshold range/threshold area 236 (or within a predefined distance of the threshold range/threshold area 236), the robotic arm 212 may cause the item to rotate. The robotic arm may cause the item to rotate by rotating a wrist of the robotic arm 212. In some embodiments, the axis of rotation of the item is perpendicular to the ground (or substantially perpendicular to the ground).

Rotation of the item may improve the ability of the sensors (e.g., sensor 222 or sensor 224 of FIG. 2B) to scan/obtain an identifier on at least one side surface if the item. As an example, the robotic arm 212 may continue to rotate the item while the item is within the threshold range/threshold area 236. As another example, the robotic arm may continue to rotate the item until all the identifiers (e.g., all the identifiers on the side surfaces of the item) have been obtained or until a threshold number of identifiers have been obtained by the one or more sensors. The threshold number of identifiers may correspond to an expected number of identifiers (e.g., a number of identifiers that is mapped to the type of item to which the item corresponds).

According to various embodiments, rotation of the item may be controlled based at least in part on one or more attributes pertaining to the item. For example, a speed or extent of rotation may be controlled based at least in part on an attribute pertaining to the item. Attributes pertaining the item may include a weight, a length, a size, etc. The rotation of the item may be controlled to prevent shear forces with respect to the item and/or the end effector of the robotic arm 212 from dislodging the item (e.g., causing the robotic arm 212 to drop the item). In some embodiments, in the case of a suction-based end effector, the rotation (e.g., speed or extent of rotation) may be controlled based on a detected pressure between the end effector and the item. The robotic system may also, or alternatively, increase a suction applied to the item when the item is being rotated. The strategy or plan determined in connection with the rotating (or changing an orientation of the item) may be determined based on a determination of a final orientation of the item according to a packing or placing of the item (e.g., in the receptacle).

Figure 2C:
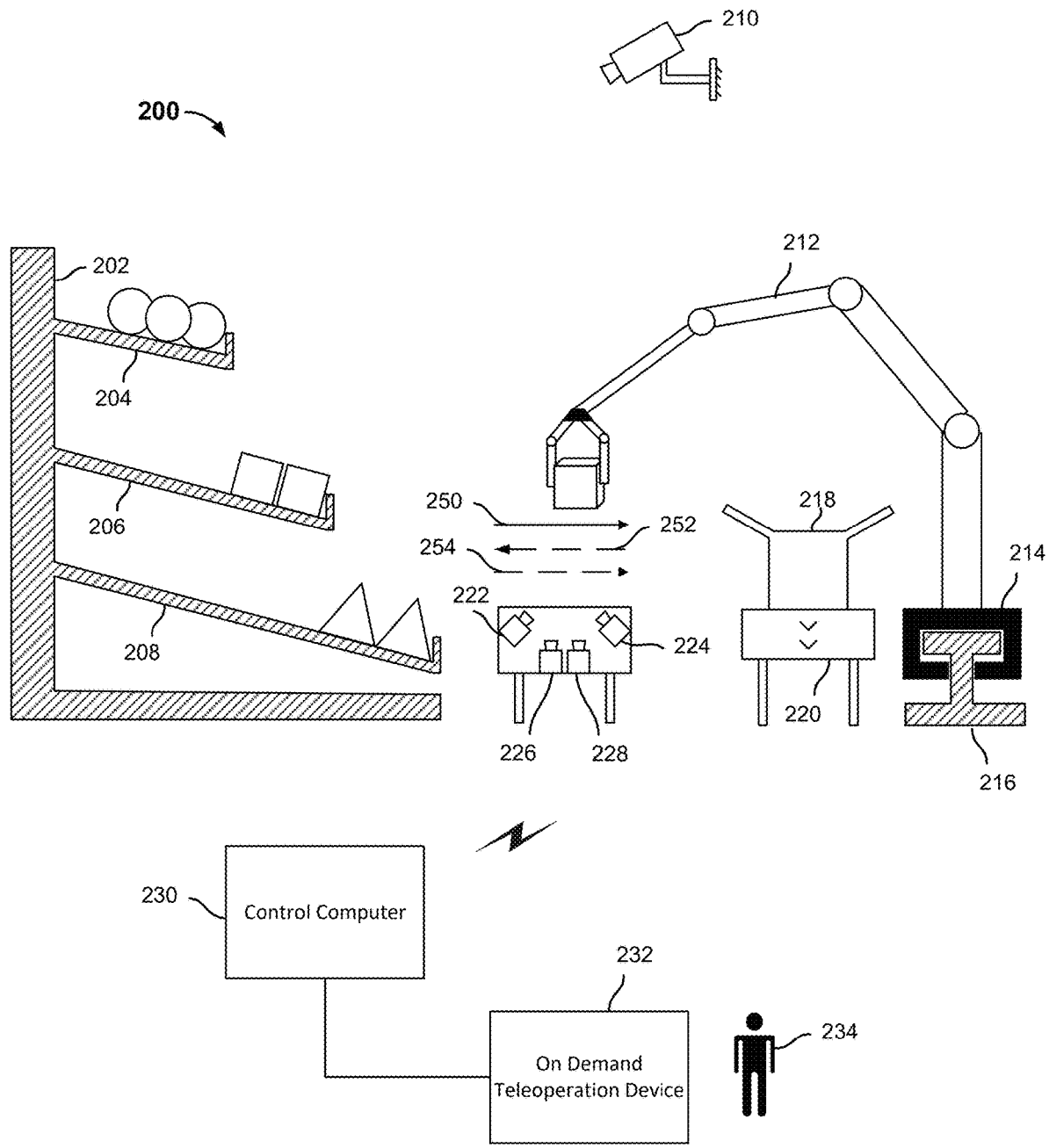
FIG. 2C is a diagram illustrating a kitting system according to various embodiments.

FIG. 2B is a diagram illustrating a kitting system according to various embodiments. FIG. 2C is a diagram illustrating a kitting system according to various embodiments.

The robotic system (control computer 230) may perform one or more active measures in connection with the scanning/obtaining of one or more identifiers on an item, such as in connection with ensuring that all the identifiers (e.g., the requisite identifiers) are obtained. According to various embodiments, the robotic system performs at least one active measure in to determining that at least one identifier was not scanned or obtained. The at least one active measure may improve the likelihood that the one or more identifiers are obtained. As an example, the at least one active measure selected to be performed may be based at least in part on a corresponding likelihood that at least one identifier will be obtained in response to the active measure being performed. Example of the active measures may include shaking the item in one or more manners; putting the item back down and picking the item up in a different manner (e.g., to change an orientation of the item, or to grab the item from a more pickable location), putting the item back down, adjusting an orientation of the item, and picking the item up in a different manner; adjust the packaging of the item with the end effector such as by applying pressure on the item/packaging (e.g., pressing down on a bag, stretching the bag, etc.), use side peripherals on the robotic arm, end effector, or workspace to adjust the item (e.g., using a compressed air blower, an air knife, a static discharger, etc.).

The determining that the at least one identifier was not scanned or obtained may be based at least in part on a number of identifiers obtained by the one or more scanners (e.g., camera 210 and/or sensors 222, 224, 226, and/or 228) and an expected number of identifiers corresponding to the item. According to various embodiments, a number of identifiers for an item (or a type of item) is known in advance and stored. For example, a mapping of a type of item to a number of identifiers on the item may be pre-stored. Control computer 230 may obtain the expected number of identifiers corresponding to the item based at least on performing a lookup in the mapping of the type of item to the number of identifiers. In some embodiments, the control computer 230 compares a number of identifiers obtained from the item by the one or more sensors to the expected number of identifiers. In response to determining that the number of identifiers obtained is less the expected number of identifiers, the control computer 230 may determine that at least one identifier was not scanned or obtained. In some implementations, control computer 230 may determine a number of identifiers that were not scanned or obtained by the one or more sensors (e.g., based on the comparison of the number of identifiers obtained to the expected number of identifiers). The comparison may be performed after the item has moved through the threshold range/threshold area 236 (e.g., before the item is placed in receptacle 218). In some embodiments, the control computer determines a side of the item for which an identifier was not obtained based on a determination of an identifier (or a type of identifier) that was not scanned (e.g., based on the comparison of expected identifiers for the item to the obtained identifier(s)).

In response to determining that at least one identifier was not scanned or obtained, one or more active measures may be performed (e.g., to attempt to obtain the at least one identifier). As illustrated in FIG. 2C, in some embodiments, the active measure includes attempting to rescan the item. For example, the active measure may include moving the item through the threshold range/threshold area one or more additional times. In some embodiments, the active measures are performed until all the one or more identifiers on the item are scanned (e.g., based on an updated comparison(s) of the number of identifiers obtained to the expected number of identifiers), or until a threshold number of attempts to scan the one or more identifiers have been performed, etc. As an example, the active measures may be performed until an earlier of all the one or more identifiers on the item being obtained and the threshold number of attempts to scan the one or more identifiers has been performed. As another example, the active measures may be performed until a threshold number of identifiers on the item are obtained. As another example, the active measures may be performed until a specific type of identifier on the item is obtained (e.g., a serial number, a model number, a product number, etc.). The control computer 230 may store (e.g., in a profile associated with the type of item corresponding to the item) an indication of one or more specific types of identifiers that are required to be obtained. As illustrated in FIG. 2C, movement 250 may correspond to an initial attempt or movement through the threshold range/threshold area 240 (not shown in FIG. 2C). In response to a determination that robotic arm 212 is to perform the active measure, item may be moved according to movement 252 and/or movement 254). In some embodiments, at least one of movement 254 is through the threshold range/threshold area. For example, movement 254 may be a rest movement that positions item for robotic arm 212 to move item through threshold range/threshold area again in accordance with movement 254.

According to various embodiments, the plan for kitting (or singulating) the item may be updated in response to a determination that the active measure is to be performed and/or in response to a determination that at least one identifier on the item was not obtained. Control computer 230 may update the plan to include a new path/trajectory. For example, the plan for kitting the item may be updated to further include movement 252 and 254.

The active measure in some embodiments further includes moving the item within a different portion of the threshold range/threshold area. As an example, one or more subsequent attempts to obtain the at least one identifier may include moving the item along a path that is closer to the one or more sensors. As another example, each additional attempt to obtain the at least one identifier may be performed at a different portion of the threshold range/threshold area, or a different distance away from at least one sensor. Moving the item within a different portion of the threshold range/threshold area may cause the item to be moved in an area where the one or more sensors have a better line of sight or a better ability to obtain identifiers from items. If an identifier is relatively small, the identifier may be better captured if the item is moved a closer distance to the one or more sensors.

In some embodiments, the active measure includes orienting the item in a manner that the ability of at least one sensor to obtain an identifier on at least one surface of the item is improved. For example, the robotic arm 212 may be controlled to orient the item such that a side surface of the item is directed towards a sensor. In the example illustrated in FIG. 2C, during an attempt to re-scan the item, robotic arm 212 may be controlled to tilt the item such that a side surface of the item is directed towards sensor 222 and/or sensor 224. The degree of the tilt may be selected based on a positioning/configuration of a sensor. For example, robotic arm 212 may be controlled to tilt the item in a manner such that a side surface of the item is perpendicular to a line of sight of a sensor. In addition to, or as an alternative to, the robotic arm 212 being controlled to tilt the item, the robotic arm 212 may be controlled to at least partially rotate the item such as by rotating a wrist of the robotic arm 212 (e.g., while the item is being moved through the threshold range/threshold area in connection with an active measure). In some embodiments, the robotic arm 212 may be controlled to vary the tilt and/or rotation of the item according to a random or predefined sequence of movements at least while the item is being moved through the threshold range/threshold area in connection with an active measure.

According to various embodiments, a sensor may be mounted on the robotic arm, a chassis of the robot, etc. The active measure may be include changing an orientation of the item relative to the sensor mounted to the robotic arm, and/or attempting a rescan of the item by the mounted sensor.

After attempting to perform the active measure a threshold number of times (e.g., attempting to rescan an item a threshold number of times), kitting system 200 may determine that an error occurred. In response to determining that an error has occurred, kitting system 200 may alert the human operator 234 via the teleoperation device 232. Alerting the human operator may include displaying an alert on the user interface. The alert may include an indication of a type of error (e.g., that the item cannot be properly scanned, that an identifier is not visible on the item, etc.).

In some cases, the kitting shelf system 202 may be improperly loaded with items such that an item on a shelf does not match the expected type of item (e.g., a wrong model of a type of item may be loaded on the shelf). Erroneous loading of the kitting shelf system may cause an error during the attempt to obtain identifiers from the item. For example, if control computer 230 expects a first type of item to be loaded onto a shelf from which the robotic arm is instructed to pick an item, and a second type of item is in fact loaded, then the expected number of identifiers to be scanned (e.g., based on the mapping of the type of item to a number of identifiers) may be incorrect. Control computer 230 may determine the expected number of identifiers for the first type of item, and if the second type of item has a different number of identifiers (e.g., first type of item has 5 expected identifiers, and second type of item has 4 expected identifiers), then a confirmation that all the expected identifiers are scanned while kitting item will be inconclusive/incorrect (e.g., the kitting system may attempt to perform an active measure to rescan the item, however, regardless of the number of attempts to rescan the identifiers, the kitting system may not be able to confirm that all the expected identifiers are scanned). Accordingly, kitting system 200 may determine that an error has occurred. Similarly, in response to obtaining the identifiers from the item, kitting system 200 may confirm that the item being picked and placed matches the plan (e.g., the order, packing slip, etc.). If the kitting shelf system is improperly stocked or if the robotic arm 212 grabs an item from a wrong shelf or bin, an identifier on the item being picked and placed may be different from the item corresponding to the plan. Accordingly, kitting system 200 may determine that an error has occurred. In response to determining that an error has occurred, kitting system 200 may attempt an active measure such as returning the item to the kitting shelf system or to a return bin, and picking up a correct item. Alternatively, in response to determining that an error has occurred, kitting system 200 may alert the human operator 234 via the teleoperation device 232. Alerting the human operator may include displaying an alert on the user interface. The alert may include an indication of a type of error (e.g., that the kitting shelf system is improperly stocked, etc.).

According to various embodiments, the sensors may be located in or around the workspace, on the robotic arm (e.g., on an end effector of the robotic arm), on the kitting shelf system, and/or on a carriage that carriers the robotic arm. As illustrated in FIGS. 2B and 2C, the threshold range/threshold area 236 may be in or around sensors that obtain information pertaining to an item moved there through. For example, the threshold range/threshold area 236 may be an area corresponding to sensors 222, 224, 226, and/or 228. In some embodiments, one or more sensors are disposed on carriage 214.

Figure 2D:
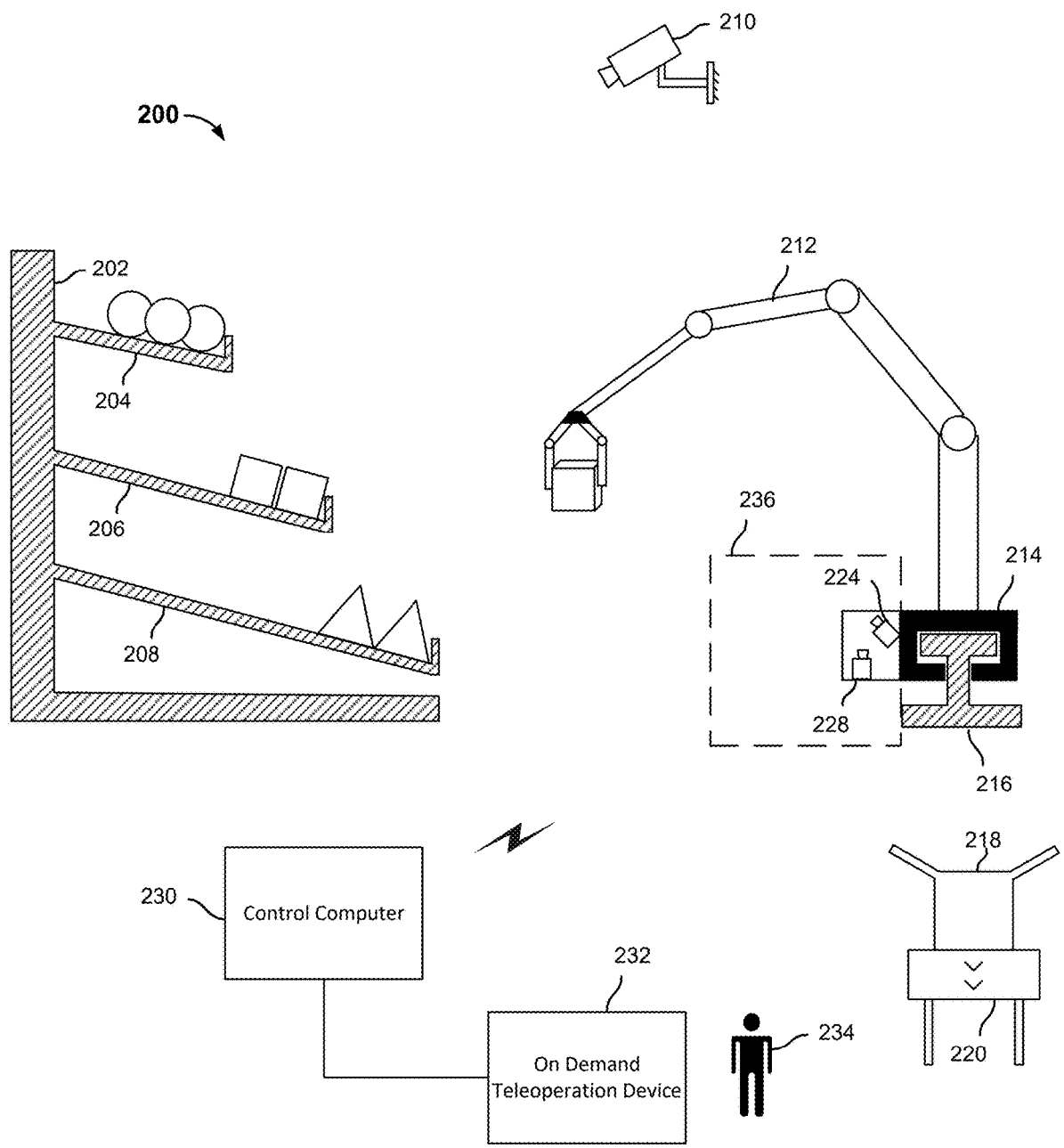
FIG. 2D is a diagram illustrating a kitting system according to various embodiments.

FIG. 2D is a diagram illustrating a kitting system according to various embodiments.

As illustrated in FIG. 2D, sensor 224 and sensor 228 are disposed on carriage 214. In some embodiments, sensor 224 and sensor 228 may be within a module that is affixed to carriage 214. In some embodiments, sensor 224 and/or sensor 228 are integrated with carriage 214.

According to various embodiments, if sensor 224 and/or sensor 228 are located on/in carriage 214, a relative location of the sensor 224 and/or sensor to robotic arm 212 (e.g., at least a base of robotic arm 212) is static. In addition, a threshold range 236 corresponding to sensor 224 and/or sensor 228 may be static relative to a location of the robotic arm 212 (e.g., at least a base of robotic arm 212). The static relative location of the threshold range/threshold area 236 may improve the efficiency with which the robotic arm may determine a plan or strategy for kitting or singulating an item. For example, the kitting system 200 (or a singulation system) may store a predefined routine for moving the item through threshold range/threshold area 236 or to otherwise attempt to scan the item. In some embodiments, the plan or strategy for moving the item to the destination location may include moving the item to a predefined location (e.g., a location that is static relative to the robotic arm 212 or base thereof) and then implementing a routine to move the item through threshold range/threshold area 236 or to otherwise attempt to scan the item by sensor 224 and/or sensor 228. After the item is scanned, the robotic arm may move the item to the destination location (e.g., to a receptacle or a predefined location on a conveyor, etc.). The predefined routine may be based on a determined path or trajectory, or set of paths and trajectories, that corresponds to an optimal path or trajectory, a path or trajectory that satisfies a threshold pertaining to a likelihood that the information associated with the item will be obtained by one or more sensors as the item through threshold range/threshold area 236.

In some embodiments, the routine or manner by which the item is moved or re-oriented while moving through threshold range/threshold area 236 may be determined based on a manner by which the item is gripped, a size of the item, a location of information on the object that is to be obtained relative to the item, a location of a sensor relative to the robotic arm, etc.

The path or trajectory, and/or the manner by which the item is moved or re-oriented while being moved to the destination location may be determined offline (e.g., by a different computing system such as a web server, etc.), and/or may be determined online by the computer system controlling the robotic arm.

Figure 3A:
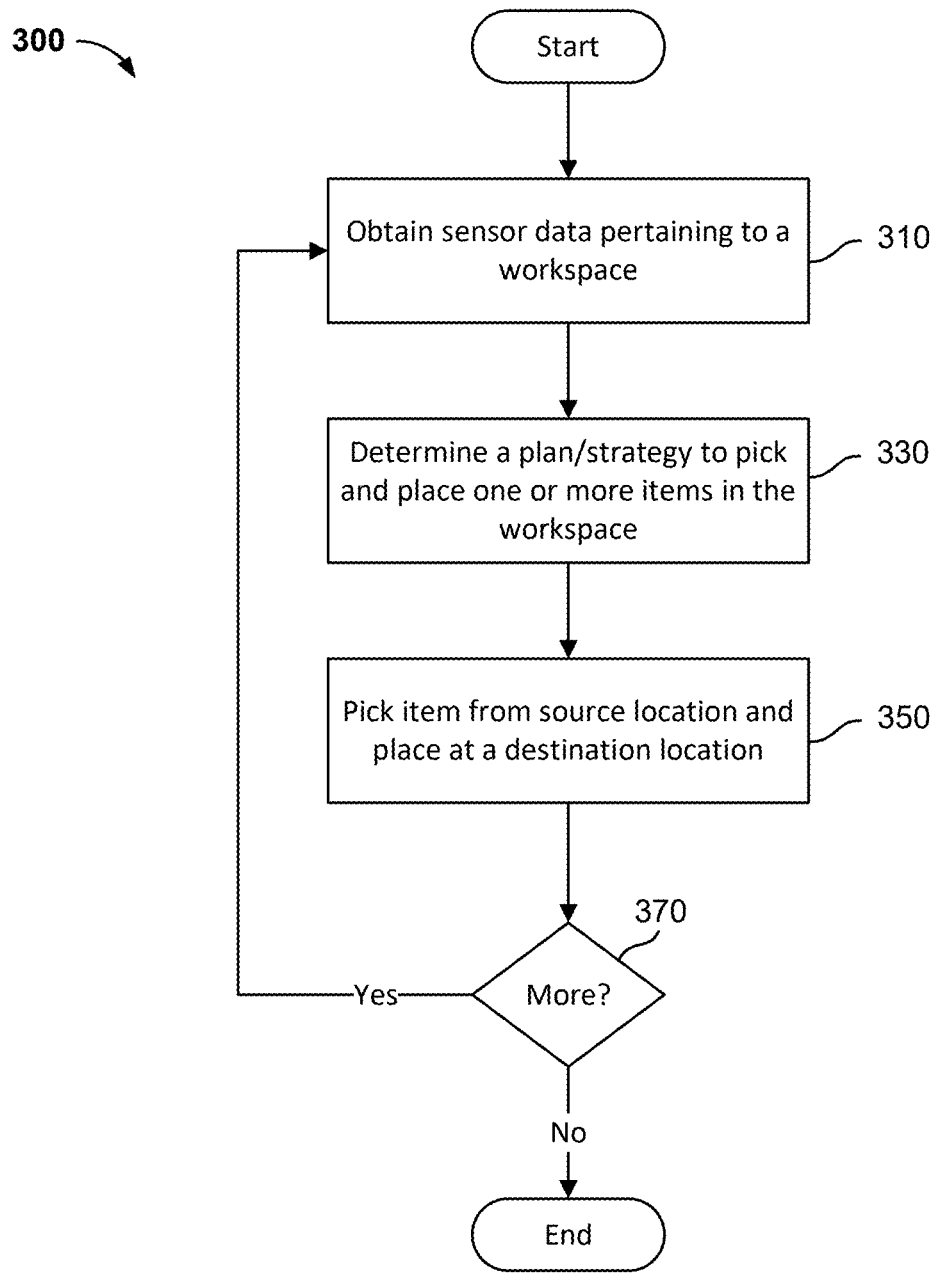
FIG. 3A is a flowchart of a method for picking and placing an item according to various embodiments.

FIG. 3A is a flowchart of a method for picking and placing an item according to various embodiments.

According to various embodiments, process 300 of FIG. 3A is implemented by singulation system 100 of FIG. 1, and/or kitting system 200 of FIGS. 2A-2C.

At 310, sensor data pertaining to a workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace may be determined based at least in part on the sensor data. The sensor data can be used in connection with determining at least one characteristic (e.g., attribute) of one or more items within the workspace such as items in the source location, an item grasped by the robotic arm, an item already positioned in at the destination location, an identifier of the receptacle, etc. In some embodiments, the sensor data is used in connection with determining one or more characteristics of the conveyance structure such as determining the receptacles or slots on the conveyor that are empty or unreserved, determining a speed of the conveyor, and/or determining the characteristics of at least one receptacle or slot or of at least one item already on the conveyor.

At 330, a plan or strategy to pick and place one or more items within the workspace is determined. A plan or strategy for singulating or kitting an item in the workspace is determined based at least in part on the sensor data. In some embodiments, a robotic system determines the plan or strategy to pick at least one item from a source location in the workspace (e.g., a source pile or flow, a shelf on a kitting system, etc.) and to place the at least one item at a destination location such as a receptacle or a slot on the conveyor. The plan or strategy to pick and place the one or more items is determined in various embodiments on a robot by robot basis such that if the robotic system includes a plurality of robots, each robot operates independent of the other robot(s).

According to various embodiments, the plan or strategy for singulating or kitting the one or more items in the workspace is determined based at least in part on the sensor data, such as sensor data including data associated with an item present in a workspace (e.g., the item to be singulated and/or an item already located on the conveyor) or another object included in the workspace. As an example, in the case of determining a plan for kitting an item, the plan or strategy may be determined based on an order (e.g., a packing slip) and/or a stored mapping of items (or types of items) to a source location such as a shelf or bin on a shelf of a kitting shelf system. As another example, in the case of determining a plan for singulating an item, the plan or strategy to singulate the one or more items includes selecting an item within the source pile/flow that is to be singulated.

The selected item can be identified from among other items or objects within the workspace (or other bins or tray of items on a kitting shelf system) based at least in part on the sensor data. As an example, one or more characteristics (or attributes) pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), a height of the item, a length of the item, an estimated weight of the item, and the like, or any combination thereof. As another example, the plan to pick and place the one or more items includes determining a destination location on the conveyance structure (e.g., a receptacle on the conveyor, a slot on the conveyor, etc.) at which the robotic structure (e.g., the robotic arm) is to place the item. The destination location on the conveyance structure at which the item is to be placed can be determined based at least in part on a timestamp, a speed of the conveyor, and one or more characteristics of a slot or receptacle on the conveyor (e.g., an indication of whether the slot or receptacle is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

In some embodiments, the determination of the plan to pick and place an item includes a determination of a manner by which the applicable robotic arm is to grasp the item. The plan to singulate the item can indicate a particular end effector to be used to pick up the item from the destination location, and one or more settings associated with the end effector in connection with grasping the item such as a grasp strength, a pressure to apply on a suction-based end effector, etc. The plan to singulate the item can indicate an orientation of one or more of the robotic arm, a wrist on the robotic arm, and/or the end effector. In some embodiments, the end effector is positioned to be orthogonal to the item when grasping the item. To so position the end effector in relation to the item, the robotic structure can control to operate the orientation of one or more of the robotic arm, a wrist on the robotic arm, and/or the end effector.

At 350, an item is picked from a source location and placed at a destination location. According to various embodiments, the robotic system (e.g., a control computer) controls a robotic arm to move the item from the source location to the destination location based at least in part on the plan or strategy. The robotic arm may move the item along the path or trajectory specified in the corresponding plan or strategy for picking and placing the item.

At 370, a determination of whether more items are to be picked and placed. If there are more items, a further iteration of steps 310, 330, and 350 is performed, and successive iterations are performed until it is determined at 370 that there are no more items (e.g., in a chute of a singulation system, a shelf of a kitting system, or other receptacle or source) to be picked and placed.

Figure 3B:
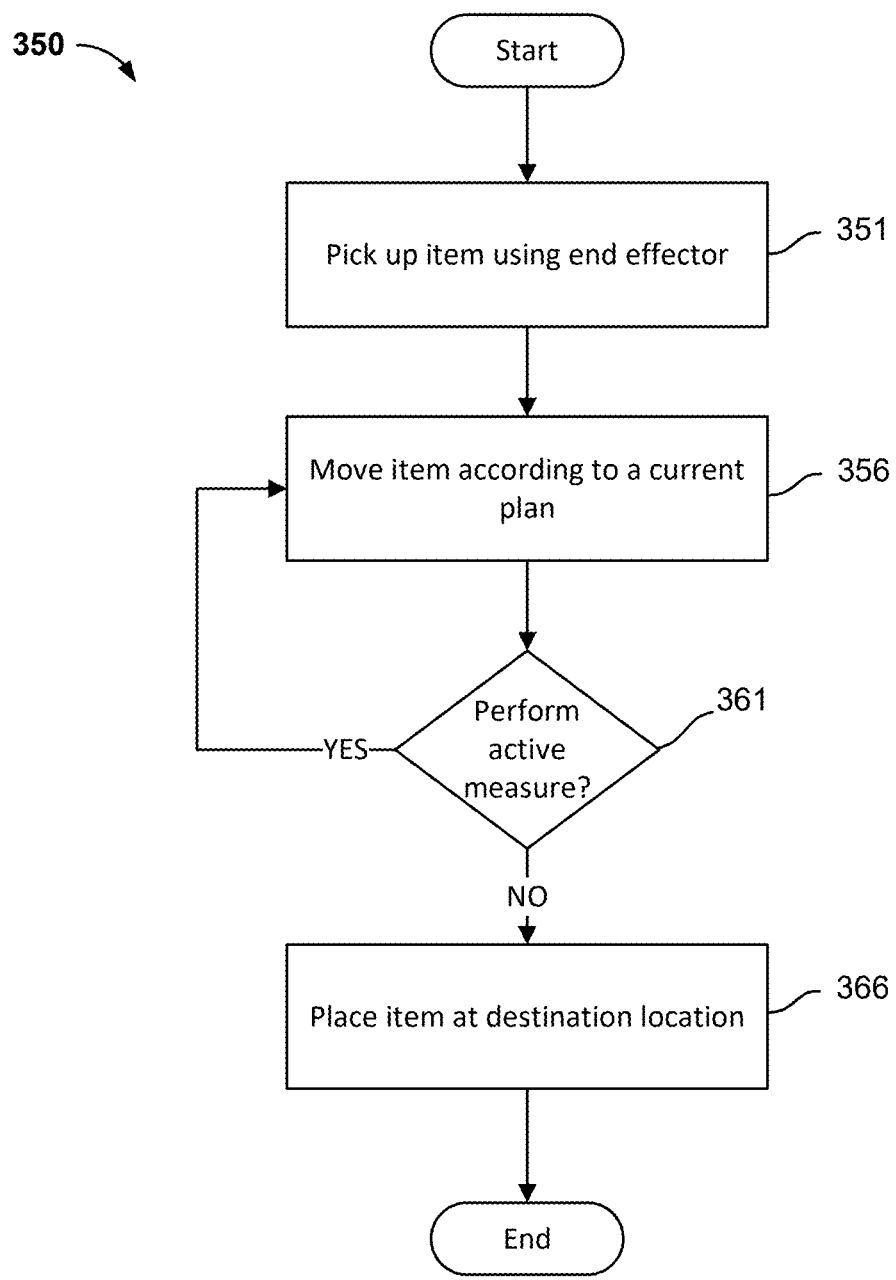
FIG. 3B is a flowchart of a method for picking and placing an item according to various embodiments.

FIG. 3B is a flowchart of a method for picking and placing an item according to various embodiments.

According to various embodiments, process 350 of FIG. 3B may correspond to 350 of FIG. 3A. Process 350 of FIG. 3B may be implemented by singulation system 100 of FIG. 1, and/or kitting system 200 of FIGS. 2A-2C.

At 351, an item is picked up by the robotic arm. In some embodiments, an end effector of the robotic arm is used in connection with grasping the item. The item may be picked up from the source location such as a tray on a shelf of a kitting shelf system, or a source flow/pile. The robotic arm may pick up the item based at least in part on the plan or strategy for picking and placing the item (e.g., based at least in part on a grasping strategy).

At 356, the item is moved according to a current plan. The current plan may include a path along which the item is to the destination location. According to various embodiments, the current plan corresponds to an initial plan (e.g., a plan that is determined when the item is determined to be picked and placed) or an updated plan (e.g., a version of the initial plan that has been updated such as in connection with the performance of one or more active measures). In some embodiments, the path is determined to allow one or more scanners to scan one or more identifiers on the item. As an example, the moving the item along the path includes moving the item within the threshold range or threshold area corresponding to one or more sensors. The threshold range/threshold area (e.g., threshold range/threshold area 236 of kitting system 200 of FIG. 2A) may be predefined based at least in part on one or more sensors within the workspace.

The one or more sensors obtain one or more identifiers from the item as the item is moved along the path. For example, an RFID sensor may obtain information from an RFID tag on the item as the item is moved along the path. As another example, a barcode or QR code on a surface of the item is scanned by a barcode or QR code reader as the item is moved along the path.

At 361, a determination is made as to whether to perform an active measure. The determination to perform the active measure may be made while the item is being moved along the path to the destination location. For example, the determination to perform the active measure may be made based on an interrupt being invoked during the movement of the item.

According to various embodiments, the robotic system determines to perform an active measure in response to determining that at least one identifier on the item was not obtained. The determining that the at least one identifier was not scanned or obtained may be based at least in part on a number of identifiers obtained by the one or more scanners and an expected number of identifiers corresponding to the item. A number of identifiers for an item (or a type of item) may be known in advance and stored. For example, a mapping of a type of item to a number of identifiers on the item may be pre-stored. The robotic system may obtain the expected number of identifiers corresponding to the item based at least on performing a lookup in the mapping of the type of item to the number of identifiers. In some embodiments, the robotic system compares a number of identifiers obtained from the item by the one or more sensors to the expected number of identifiers. In response to determining that the number of identifiers obtained is less the expected number of identifiers, the robotic system may determine that at least one identifier was not scanned or obtained. In some implementations, the robotic system may determine a number of identifiers that were not scanned or obtained by the one or more sensors (e.g., based on the comparison of the number of identifiers obtained to the expected number of identifiers). The comparison may be performed after the item has moved through the threshold range/threshold area (e.g., before the item is placed in receptacle). In some embodiments, the robotic system determines a side of the item for which an identifier was not obtained based on a determination of an identifier (or a type of identifier) that was not scanned (e.g., based on the comparison of expected identifiers for the item to the obtained identifier(s)).

In some embodiments, the robotic system determines to perform an active measure in response to determining that an identifier was not properly obtained (e.g., an identifier was partially scanned, etc.). If the item is moved too quickly across the line of sight or otherwise within the threshold range of the one or more sensors, the one or more sensors may not properly capture an identifier on the image. In response to determining that the at least one identifier was not properly captured (e.g., a part of a barcode or QR code is captured, or an RFID tag is recognized but complete information is obtained therefrom), the robotic system may determine to perform the active measure.

In some embodiments, the robotic system may determine that the item grasped is improper. For example, the item may be type of item that is different from the type of item specified in the plan (or an order for which the plan is generated/determined). In response to obtaining at least one identifier on the item, the robotic system may determine that the at least one identifier does not match an identifier or type of identifier that is expected based at least in part on the plan (or an order for which the plan is generated/determined). For example, in response to scanning an identifier on the item, the robotic system may determine that a model type of the item is incorrect. Accordingly, the robotic system may determine that an active measure is to be performed. The active measure may include returning the item to the kitting shelf system, returning the item to a location designated as a return or discard area, and/or alerting a human operator of the error.

The robotic system may determine that an active measure is to be performed based at least in part on an area in which at least part of the robotic arm is located, or an area in which the item is located. The location of at least part of the robotic arm or the item (e.g., the item grasped by the robotic arm) may be determined based on information obtained by one or more sensors or sensor arrays in the workspace. In some embodiments, the robotic system determines to perform the active measure in response to determining that the item or part of the robotic arm (e.g., the end effector) is within the threshold range/threshold area or within a predefined distance of the threshold range/threshold area. As an example, the active may include rotating the item or otherwise changing an orientation of the item (e.g., rotating the item or changing a tilt of the item while the item is moved through the threshold range/threshold area).

In response to a determination that an active measure is to be performed, process 350 returns to 356 at which the plan is updated and the item is moved based at least in part on the current plan (e.g., the updated plan). In contrast, in response to a determination that an active measure is not to be performed, process 350 may end.

Figure 3C:
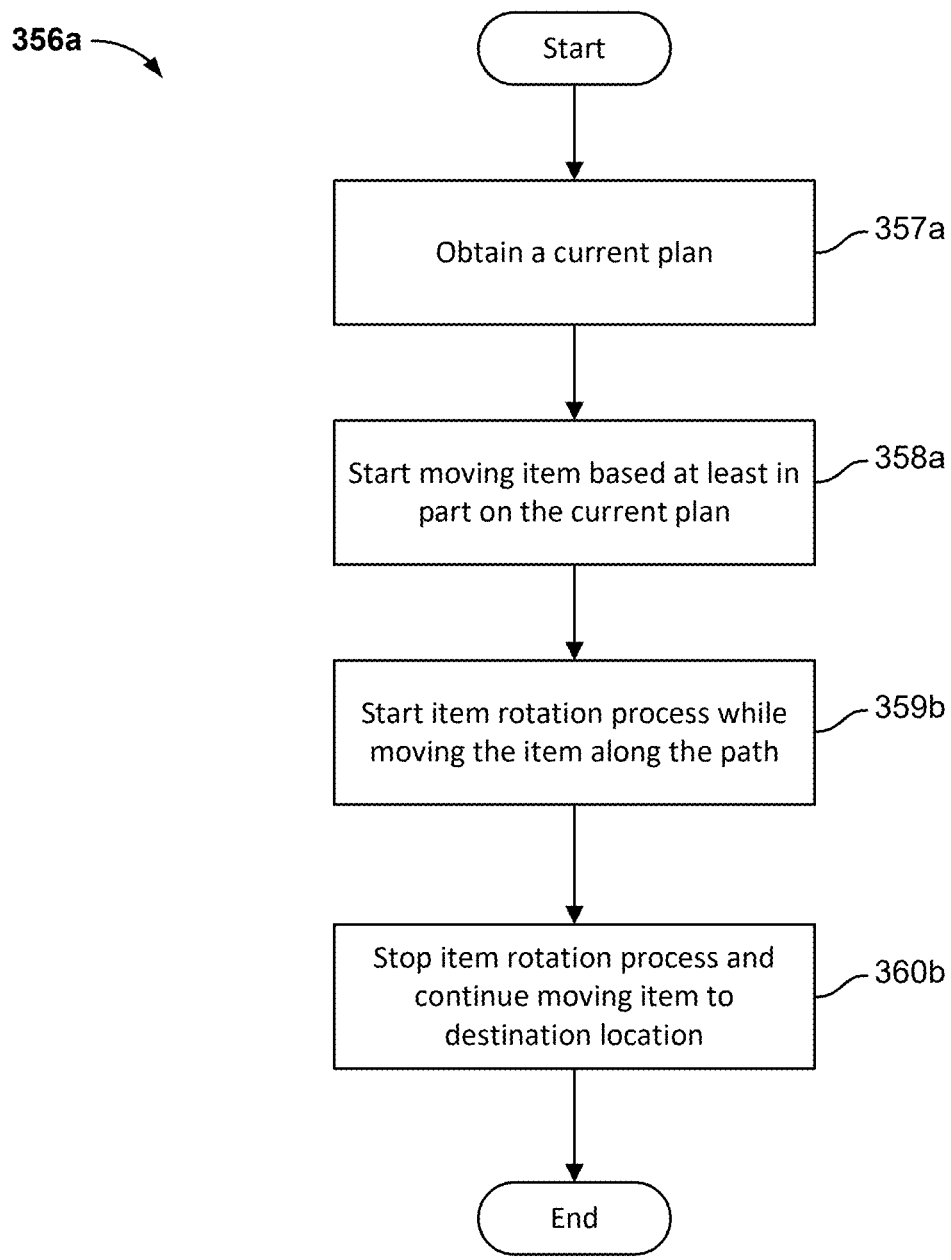
FIG. 3C is a flowchart of a method for scanning an item according to various embodiments.

FIG. 3C is a flowchart of a method for scanning an item according to various embodiments.

According to various embodiments, process 356a of FIG. 3C may correspond to 356 of FIG. 3B. Process 356a of FIG. 3C may be implemented by singulation system 100 of FIG. 1, and/or kitting system 200 of FIGS. 2A-2C.

At 357a, a current plan is obtained. The plan may be determined for picking an item from a source location to a destination location. In some embodiments, in connection with an initial attempt to obtain one or more identifiers from the item, the current plan may include moving the item within proximity of the one or more sensors (e.g., within the threshold range/threshold area). According to various embodiments, in response to determining that an active measure is to be performed, according to various embodiments, the robotic system updates the plan (e.g., the plan for picking and placing the item). The plan may be updated based at least in part on the active measure such as a type of active measure to be determined, etc. After determining that the active measure is to be performed, the current plan may correspond to the updated plan.

For example, the plan may be updated to include re-attempting to obtain at least one identifier from the item. Re-attempting to obtain the at least one identifier from the item may include moving the item within proximity of one or more scanners (e.g., moving the item through the threshold range/threshold area one or more additional times). Accordingly, the plan may be updated to include instructions to so move the item.

At 358a, the item is moved based at least in part on the current plan. The robotic arm may be controlled to autonomously move the item according to the current plan. For example, in connection with an initial attempt to obtain the one or more identifiers from the item, the item is moved along a path from the source location to the destination location, and the path includes moving the item with proximity of the one or more scanners.

At 359a, an item rotation process is started while the item is moved through the threshold area. According to various embodiments, an item is rotated while the item is being moved. For example, the item may be rotated along substantially the entire path from the source location to the destination location. As another example, the item may be rotated in response to a determination that the item is within proximity of the one or more sensors (e.g., in response to a determination that the item is within the threshold range/threshold area).

At 360a, the item rotation process is stopped and the item is further moved to the destination location. In some embodiments, after the item is determined to be no longer in proximity of the one or more sensors, the robotic system may stop rotating the item. For example, the robotic arm may be controlled to stop rotating the item as the item is within a threshold distance of the destination location. As another example, the robotic arm may be controlled to stop rotating the item in response to a determination that the item has exited the threshold range/threshold area.

Figure 3D:
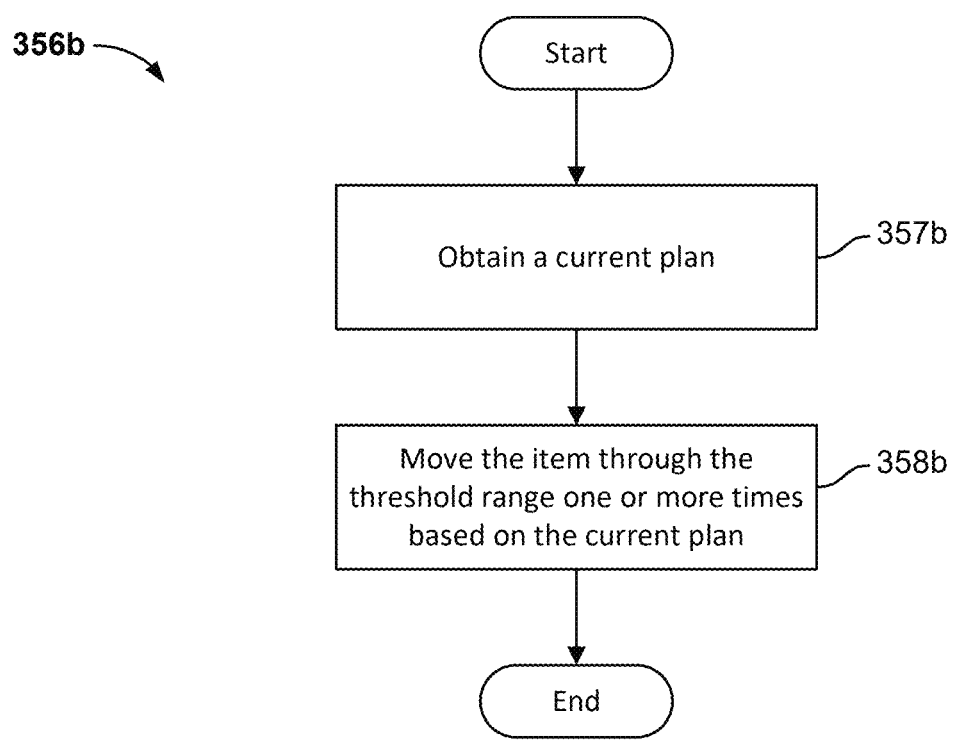
FIG. 3D is a flowchart of a method for determining whether to perform an active measure in connection with scanning an item according to various embodiments.

FIG. 3D is a flowchart of a method for determining whether to perform an active measure in connection with scanning an item according to various embodiments.

According to various embodiments, process 356b of FIG. 3D may correspond to 356 of FIG. 3B. Process 356b of FIG. 3D may be implemented by singulation system 100 of FIG. 1, and/or kitting system 200 of FIGS. 2A-2C.

At 357b, a current plan is obtained. The plan may be determined for picking an item from a source location to a destination location. In some embodiments, in connection with an initial attempt to obtain one or more identifiers from the item, the current plan may include moving the item within proximity of the one or more sensors (e.g., within the threshold range/threshold area). According to various embodiments, in response to determining that an active measure is to be performed, according to various embodiments, the robotic system updates the plan (e.g., the plan for picking and placing the item). The plan may be updated based at least in part on the active measure such as a type of active measure to be determined, etc. After determining that the active measure is to be performed, the current plan may correspond to the updated plan.

For example, the plan may be updated to include re-attempting to obtain at least one identifier from the item. Re-attempting to obtain the at least one identifier from the item may include moving the item within proximity of one or more scanners (e.g., moving the item through the threshold range/threshold area one or more additional times). Accordingly, the plan may be updated to include instructions to so move the item.

The current plan may be obtained based at least in part on a determination of a likelihood that one or more identifiers on the item will be obtained if the item is move along a corresponding path. For example, the current plan may be determined based at least in part on a determination of a manner of picking and placing the item that optimizes the likelihood that the identifier will be read by a sensor within the workspace. The determination of a likelihood that one or more identifiers on the item will be obtained if the item is move along a corresponding path may be based at least in part on a determination of the path in a manner to optimize the likelihood that one or more labels or identifiers will be exposed to one or more sensors. The determination of the path in a manner to optimize the likelihood that one or more labels or identifiers will be exposed to one or more sensors may include determining a set of paths along which the item may be moved and corresponding probabilities that a label or identifier on the item would be scanned if the item were moved along that path (e.g., the probability may be based on a location of the item relative to a sensor or a side of the item relative to a sensor, a distance of the item to the sensor, etc.), and selecting the path that has a highest corresponding probability. In some embodiments, a path having a corresponding probability that exceeds a threshold probability, or that is within a predefined percent or number of the set of paths having the highest corresponding probabilities is determined. In some embodiments, a path and corresponding probability that the label or identifier on the item would be scanned if the item were moved along such path are determined, and the probability is compared to a predefined threshold for a minimum desired probability. In response to determining that the probability corresponding to a particular path does not exceed the predefined threshold for a minimum desired probability, a new path and corresponding probability are determined. The robotic system can continue to iterate determining the path and corresponding probability until the robotic system determines that the corresponding probability exceeds the predefined threshold for a minimum desired probability. The determining the path may comprise weighting different factors and maximizing a composite score pertaining to the weighted values of the different factors. The different factors may include a likelihood that the one or more identifiers are obtained, the likelihood of success for picking and placing the item, an expected time to pick and place the item if the item were moved along the corresponding path, the presence/location of another object within the workspace (e.g., another robotic arm, a receptacle, another item, etc.), etc.

At 358b, the item is moved based at least in part on the current plan. The robotic arm may be controlled to autonomously move the item according to the current plan. For example, in connection with an initial attempt to obtain the one or more identifiers from the item, the item is moved along a path from the source location to the destination location, and the path includes moving the item within proximity of the one or more scanners. As another example, in connection with performing an active measure, the item is moved within proximity of the one or more scanners one or more additional times (e.g., the robotic arm moves the item back and forth through the threshold range/threshold area).

Figure 3E:
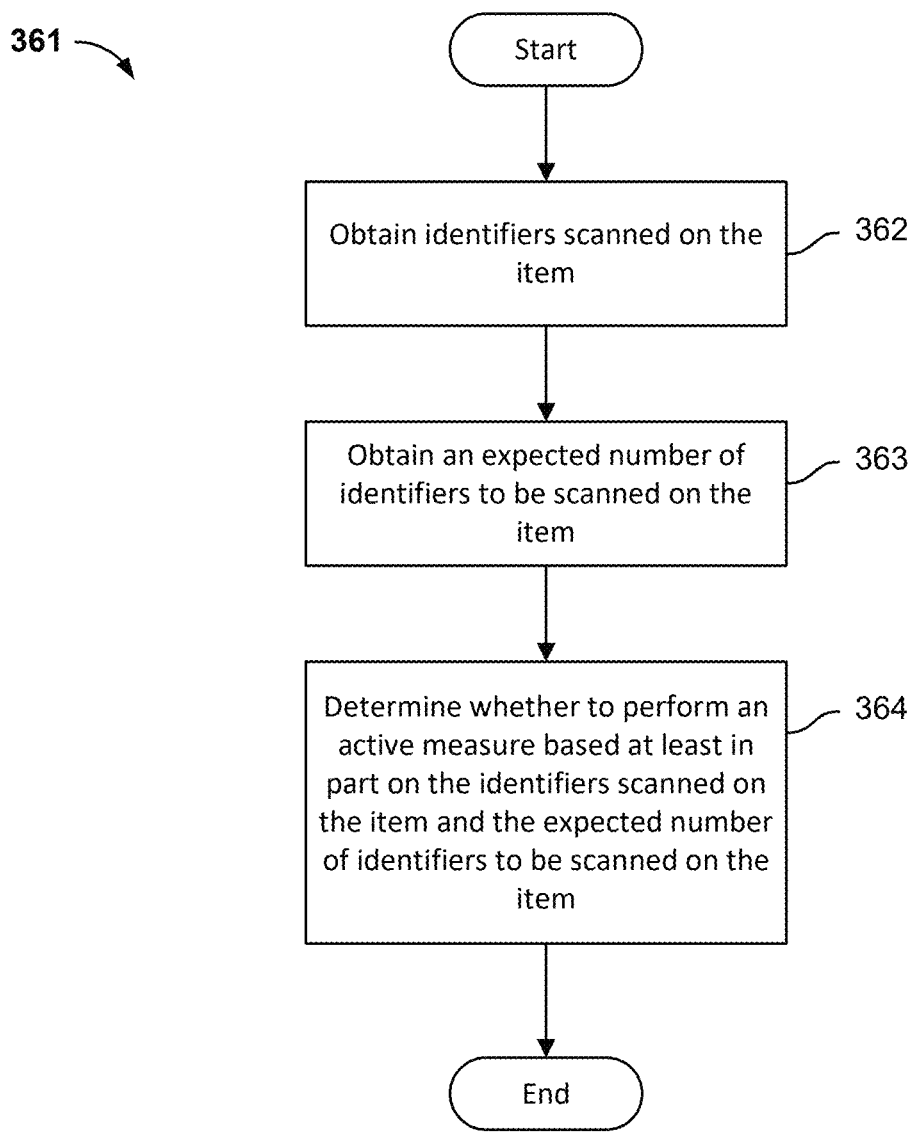
FIG. 3E is a flowchart of a method for determining whether to perform an active measure in connection with scanning an item according to various embodiments.

FIG. 3E is a flowchart of a method for determining whether to perform an active measure in connection with scanning an item according to various embodiments.

According to various embodiments, process 361 of FIG. 3E may correspond to 361 of FIG. 3B. Process 361 of FIG. 3B may be implemented by singulation system 100 of FIG. 1, and/or kitting system 200 of FIGS. 2A-2C.

At 362, one or more identifiers scanned on the item are obtained. In some embodiments, the robotic system determines the one or more identifiers that have been obtained by one or more sensors (e.g., within the workspace). The one or more identifiers that have been obtained may be stored in a data structure in which obtained identifiers are mapped to items. In some embodiments, the obtaining the one or more identifiers scanned on the item comprises determining a number of identifiers (e.g., different identifiers) that have been obtained by one or more sensors in connection with scanning an item. The obtaining the one or more identifier scanned on the item may include obtaining one or more attributes associated with the one or more identifiers (e.g., a type of identifier such as a model number, a serial number, a lot number, a manufacturer identifier, etc.).

At 363, an expected number of identifiers to be scanned on the item is obtained. The robotic system may obtain the expected number of identifiers to be scanned may be based at least in part on the plan (e.g., based on the item to be picked and placed, and/or a type of item corresponding to the item to be picked and placed).

In some embodiments, information indicating a number of identifiers on an item is stored in advance (e.g., before the item is kitted or singulated). For example, the robotic system may store a mapping of items or types of items to a number of identifiers. The number of identifiers mapped to an item or type of item may correspond to an expected number of identifiers. If the robotic system determines that a number of identifiers obtained (or for which information was obtained) by the one or more sensors is less than the expected number of identifiers for the item, then the robotic system may determine that the information obtained by the one or more sensors is insufficient (e.g., that information pertaining to at least one of the one or more identifiers was not captured).

At 364, the system determines whether to perform an active measure based at least in part on the identifiers scanned on the item and the expected number of identifiers to be scanned on the item.

Various embodiments include performing an active measure in response to a determination that the one or more sensors did not obtain information for at least one identifier. For example, in response to the robotic system determining that a number of identifiers obtained (or for which information was obtained) by the one or more sensors is less than the expected number of identifiers for the item, the robotic system may perform the active measure. The active measure may comprise performing one or more further attempts to scan the at least one identifier. For example, the active measure may include moving the item through the threshold range (e.g., within the line of sight of at least one sensor). The active measure may include changing an orientation of the item (e.g., an orientation of one or more sides relative to one or more sensors). The robotic system may change the orientation before performing one or more further attempts to have the information corresponding to the at least one identifier obtained by the one or more sensors. The orientation of the item may be changed while the robotic arm is moving. For example, the robotic arm may be controlled to rotate a wrist of the robotic arm. In some embodiments, the orientation of the item is changed while the robotic arm is moving through at least part of the threshold range of the one or more sensors (e.g., while the item is within a line of sight of at least one sensor). The active measure may include iteratively attempting to obtain the at least one identifier (e.g., the identifier(s) that were not obtained) until (i) all of the identifiers for the item are obtained (or a threshold number of identifiers are obtained), and/or (ii) a threshold number of re-attempts to obtain the at least one identifier have been performed. As an example, the re-attempts to obtain the at least one identifier may be iteratively performed until the earlier of (i) and (ii).

Figure 4:
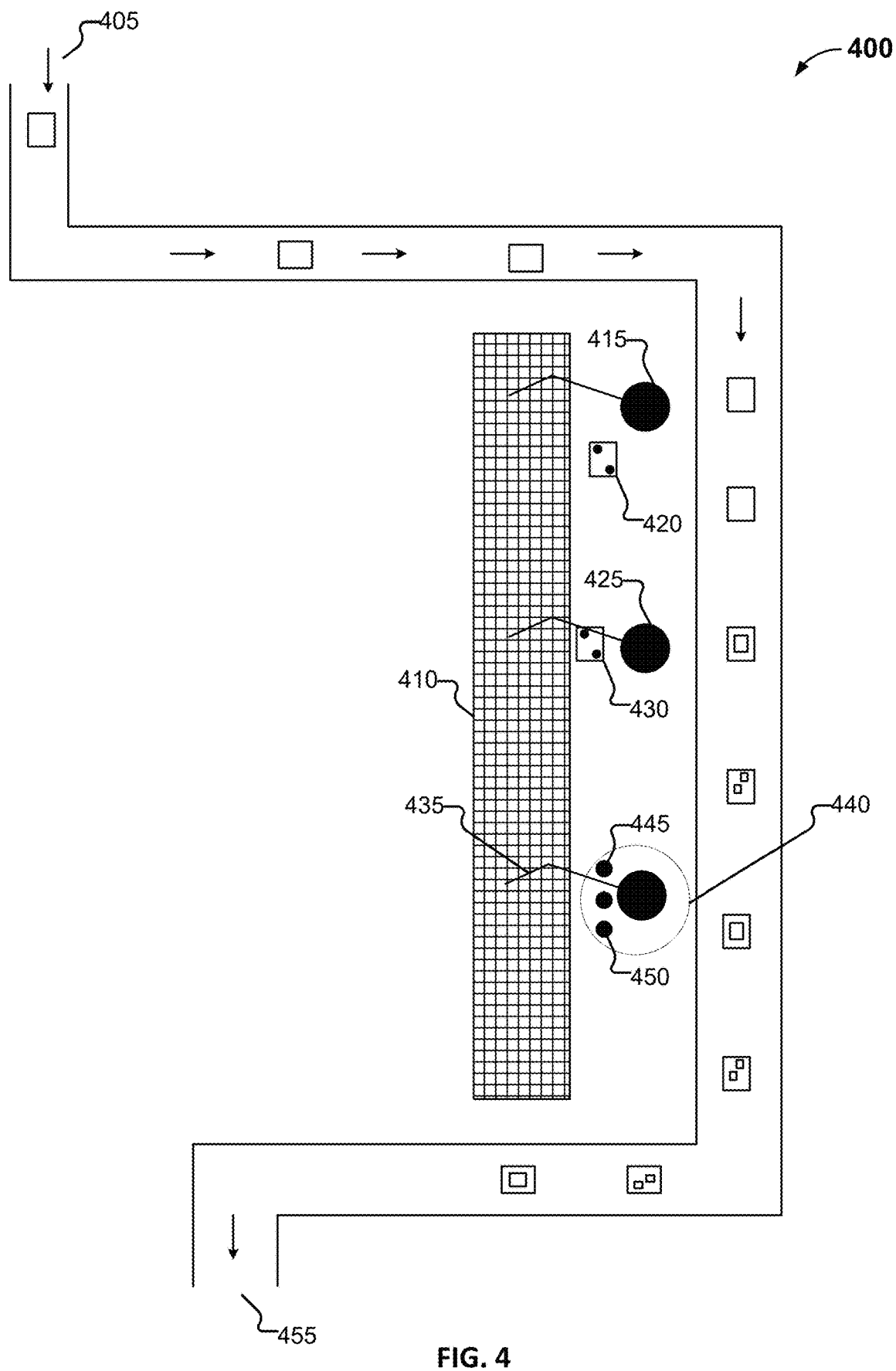
FIG. 4 is a diagram illustrating a kitting system according to various embodiments.

FIG. 4 is a diagram illustrating a kitting system according to various embodiments.

As illustrated in FIG. 4, kitting system 400 comprises a conveyance system that carries (e.g., distributes) totes to various kitting shelf machines. The totes (e.g., receptacles) may be input to the conveyance system at input area 405. Various ones of the totes are distributed to areas respectively corresponding to a kitting shelf machine such as kitting shelf machine 410. A plurality of kitting shelf machines may be interconnected via the conveyance system.

In some embodiments, conveyance structure terminates at a kitting shelf machine such. If the conveyance structure terminates at a kitting shelf machine, the totes that have been packed with one or more items may be removed from the kitting shelf machine such as by a human operator (or otherwise manually removed) or from a different system.

In some embodiments, a plurality of kitting shelf machines are interconnected via the conveyance structure. For example, a plurality of kitting shelf machines may share a common input area 405 at which totes (e.g., empty totes) are input to the kitting system. As another example, a plurality of kitting shelf machines may share a common output area 455 at which totes (e.g., totes packed with one or more items) are output from the kitting system such as an area from where the totes are sent for packing, labelling, and/or other processing, etc. As another example, plurality of kitting shelf machines may share a common output area 455 and a common input area 405. In some embodiments, a kitting shelf system may comprise a plurality of kitting shelf machines such as kitting shelf machines disposed on opposing sides of a conveyor. In some embodiments, each kitting shelf system may comprise a control computer(s) that controls a plurality of kitting shelf machines and corresponding robotic arms. In other embodiments, each kitting shelf machine may comprise its own control computer that controls the kitting shelf machine and corresponding robot. In other embodiments, kitting system 400 comprises a control computer that controls a plurality of kitting shelf systems and/or a plurality of kitting shelf machines.

In some embodiments, kitting system 400 may store and/or manage a data structure pertaining to an association of totes (e.g., trays) with orders or items. For example, a kitting shelf machine (or controller associated therewith) may reserve an empty tote for the kitting shelf machine to place items that a corresponding robotic arm has picked from the kitting shelf. As another example, in response to items being packed in a tote, the data structure may be updated to include a mapping of an identifier of the tote to an order for which the items are kitted and/or a mapping of an identifier of the tote to one or more items comprised in the tote.

Kitting system 400 may include a robotic arm or a plurality of robotic arms such as robotic arm 415, robotic arm 425, and/or robotic arm 435. One or more of the plurality of robotic arms may be connected to a base that has a static position relative to the kitting shelf machine 410. As another example, one or more of the robotic arms may be fixed to one or more carriages that respectively traverse one or more rails to move at least one robotic arm relative to the kitting shelf machine 410.

Kitting system 400 may comprise one or more sensors and/or one or more arrays of sensors disposed along the conveyance structure or in or around the plurality of robotic arms (e.g., robotic arm 415, robotic arm 425, and robotic arm 435). For example, the kitting system 400 may comprise one or more sensors at input area 405. As another example, the kitting system 900 may comprise one or more sensors at output area 455. As another example, the kitting system 400 may comprise sensors at areas along the conveyance structure where kitting machines are disposed. The sensors may be used in connection with associating totes with orders and/or items to be kitted (or that are kitted) within the totes. The sensors may also be used in connection with determining one or more attributes associated with the totes and/or items within the totes (e.g., obtaining an identifier on the identifier and/or an identifier on the one or more items, etc.).

One or more sensors may be disposed within a workspace of a robotic arm such as the one or more sensors 410 disposed within proximity of robotic arm 415, or the one or more sensors 430 disposed within proximity of robotic arm 425. If the one or more sensors are disposed at a fixed position relative to the kitting shelf machine 410, the computer system may determine the plan or strategy for moving the item through a threshold area or threshold range corresponding to a set of one or more sensors, where the threshold area or threshold range has a defined fixed location relative to the kitting shelf machine.

According to various embodiments, kitting system 400 comprises one or more sensors disposed on, or integrated with, a base of a robotic arm or carriage on which the robotic arm is mounted. For example, sensor 445 and/or sensor 450 are dispose on, or integrated with the base of robotic arm 435. If sensor 445 and/or sensor 450 are located on/in the base of robotic arm 435, a relative location of the sensor 445 and/or sensor 450 to robotic arm 435 (e.g., at least a base of robotic arm 435) is static. In addition, a threshold range corresponding to sensor 445 and/or sensor 450 may be static relative to a location of the robotic arm 435 (e.g., at least a base of robotic arm 435). The static relative location of the threshold range/threshold area may improve the efficiency with which the robotic arm may determine a plan or strategy for kitting or singulating an item. For example, the kitting system 400 (or a singulation system) may store a predefined routine for moving the item through threshold range/threshold area 436 or to otherwise attempt to scan the item. In some embodiments, the plan or strategy for moving the item to the destination location may include moving the item to a predefined location (e.g., a location that is static relative to the robotic arm 435 or base thereof) and then implementing a routine to move the item through threshold range/threshold area or to otherwise attempt to scan the item by sensor 445 and/or sensor 450. After the item is scanned, the robotic arm may move the item to the destination location (e.g., to a receptacle or a predefined location on a conveyor, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
   a communication interface; and
   one or more processors coupled to the communication interface and configured to:
   autonomously operate a robotic structure having a robotic arm to pick an item using an end effector of the robotic arm along a predetermined path from a source location to a destination location according to a plan, wherein a number of identifiers for the item are known in advance;
   move the picked item according to the plan;
   determine to perform an active measure at least in part to obtain an identifier determined to be missing based on information received via the communication interface from one or more sensors, wherein the processor is configured to determine to perform the active measure by comparing a number of obtained identifiers to a number of expected identifiers, wherein the identifier is determined to be missing after the comparison; and autonomously operate the robotic structure to place the item at the destination location based at least in part on the plan.

2. The robotic system of claim 1, wherein the item is picked from a tray, a source flow, or a source pile.

3. The robotic system of claim 1, wherein the item is picked up based at least in part on a grasping strategy.

4. The robotic system of claim 1, wherein the predetermined path is determined to allow one or more scanners to scan one or more identifiers associated with the item.

5. The robotic system of claim 1, wherein the one or more scanners include a barcode scanner, a radio frequency identifier (RFID) scanner, and/or a quick-response (QR) code scanner.

6. The robotic system of claim 1, wherein the plan includes moving the item within a threshold range or threshold area corresponding to one or more sensors.

7. The robotic system of claim 6, wherein the threshold range or the threshold area is determined based on historical information.

8. The robotic system of claim 1, wherein the identifier determined to be missing is attempted to be obtained from the one or more sensors as the item is moved along the predetermined path.

9. The robotic system of claim 1, wherein the identifier is a label, a bar code, a symbol, an image, an alphanumeric string, a code, an RFID tag, or machine readable information.

10. The robotic system of claim 1, wherein the comparison is performed after the item has moved through a threshold range or a threshold area corresponding to one or more sensors.

11. The robotic system of claim 1, wherein the processor is configured to determine to perform the active measure in response to determining the number of obtained identifiers is less than an expected number of identifiers.

12. The robotic system of claim 1, wherein the plan is updated in response to determining that the identifier is determined to be missing.

13. The robotic system of claim 12, wherein the processor is further configured to move and place the picked item according to the updated plan.

14. The robotic system of claim 1, wherein the active measure includes returning the item to the source location, placing the item in a return area, placing the item in a discard area, and/or alerting an operator.

15. The robotic system of claim 1, wherein the active measure includes rotating and/or changing an orientation associated with the item.

16. The robotic system of claim 1, wherein the active measure includes attempting to rescan the item.

17. A method, comprising:
autonomously operating a robotic structure having a robotic arm to pick an item using an end effector of the robotic arm along a predetermined path from a source location to a destination location according to a plan, wherein a number of identifiers for the item are known in advance;
moving the picked item according to the plan;
determining to perform an active measure at least in part to obtain an identifier determined to be missing based on information received via the communication interface from one or more sensors, wherein determining to perform the active measure includes comparing a number of obtained identifiers to a number of expected identifiers, wherein the identifier is determined to be missing after the comparison; and
autonomously operating the robotic structure to place the item at the destination location based at least in part on the plan.

18. A computer program product embodied in a non-transitory computer readable medium and comprising computer instructions for:
autonomously operating a robotic structure having a robotic arm to pick an item using an end effector of the robotic arm along a predetermined path from a source location to a destination location according to a plan, wherein a number of identifiers for the item are known in advance;
moving the picked item according to the plan;
determining to perform an active measure at least in part to obtain an identifier determined to be missing based on information received via the communication interface from one or more sensors, wherein determining to perform the active measure includes comparing a number of obtained identifiers to a number of expected identifiers, wherein the identifier is determined to be missing after the comparison; and
autonomously operating the robotic structure to place the item at the destination location based at least in part on the plan.

* * * * *